(12) United States Patent
Watson et al.

(10) Patent No.: US 6,688,690 B2
(45) Date of Patent: Feb. 10, 2004

(54) OFFICE CHAIR

(75) Inventors: Ronnie K. Watson, Georgetown, TX (US); Anthony K. Chapman, Temple, TX (US); Matthew E. Chrostowski, Agoura Hills, CA (US); Randall C. Lewis, Simi Valley, CA (US); Timothy P. Coffield, Grand Rapids, MI (US); James W. Bach, Gowen, MI (US); David F. Bach, Rockford, MI (US); Christopher G. Inman, Trufant, MI (US); Scott M. Ebenstein, Rockford, MI (US)

(73) Assignee: JSJ Seating Company Texas, L.P., Belton, TX (US)

( * ) Notice: Subject to any disclaimer, the term of this patent is extended or adjusted under 35 U.S.C. 154(b) by 0 days.

(21) Appl. No.: 09/883,646

(22) Filed: Jun. 18, 2001

(65) Prior Publication Data

US 2002/0096920 A1 Jul. 25, 2002

Related U.S. Application Data

(63) Continuation-in-part of application No. 09/769,967, filed on Jan. 25, 2001.

(51) Int. Cl.$^7$ ............................................. A47C 1/032
(52) U.S. Cl. ....................... 297/316; 297/317; 297/322
(58) Field of Search ................ 297/316, 317, 297/318, 322, 300.2

(56) References Cited

U.S. PATENT DOCUMENTS

| | | | | |
|---|---|---|---|---|
| 2,925,122 A | * | 2/1960 | Winick | 297/318 |
| 4,966,411 A | * | 10/1990 | Katagiri et al. | 297/322 X |
| 5,150,948 A | * | 9/1992 | Volkle | 297/317 X |
| 5,314,237 A | * | 5/1994 | Koepke et al. | 297/318 |
| 5,782,534 A | * | 7/1998 | Desanta | 297/423.13 |
| 5,871,258 A | * | 2/1999 | Battey et al. | 297/317 X |
| 6,467,842 B1 | * | 10/2002 | Lu | 297/316 X |

* cited by examiner

Primary Examiner—Anthony D. Barfield
(74) Attorney, Agent, or Firm—Warner Norcross & Judd LLP

(57) ABSTRACT

A chair having an adjustable resilient back recliner mechanism, a pair of adjustable armrests, modular upper back portions and an adjustable lumbar support. The chair includes a tension control that adjusts the tension in the recliner mechanism. The tension control is cam-operated to permit adjustment throughout the entire range of adjustability with only limited rotational movement of a control knob. The chair includes a recline limit control that adjusts the limit of rearward movement in the recliner mechanism. The limit control includes a cable operated stop that interact with a stepped trackway on the seat. The chair further includes a height control for adjusting the seat height including a push-button located in the tension control knob. The armrests include height and angle adjustment mechanisms. The lumbar support includes a lumbar cam that is rotatably mounted to a lumbar pad. The lumbar cam includes a plurality of lobes that vary in radius so that rotation of the cam causes variation in the contour of the lumbar region. The chair back includes a fabric carrier with an upper back portion mounting platform that permits attachment of any of a variety of modular upper back portions.

15 Claims, 39 Drawing Sheets

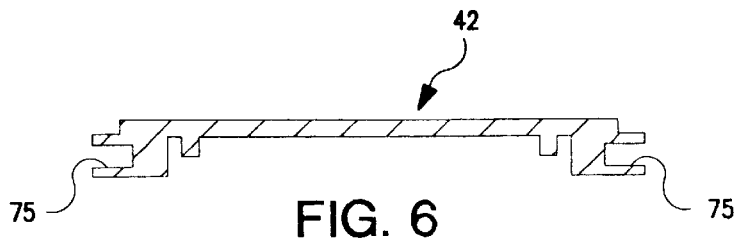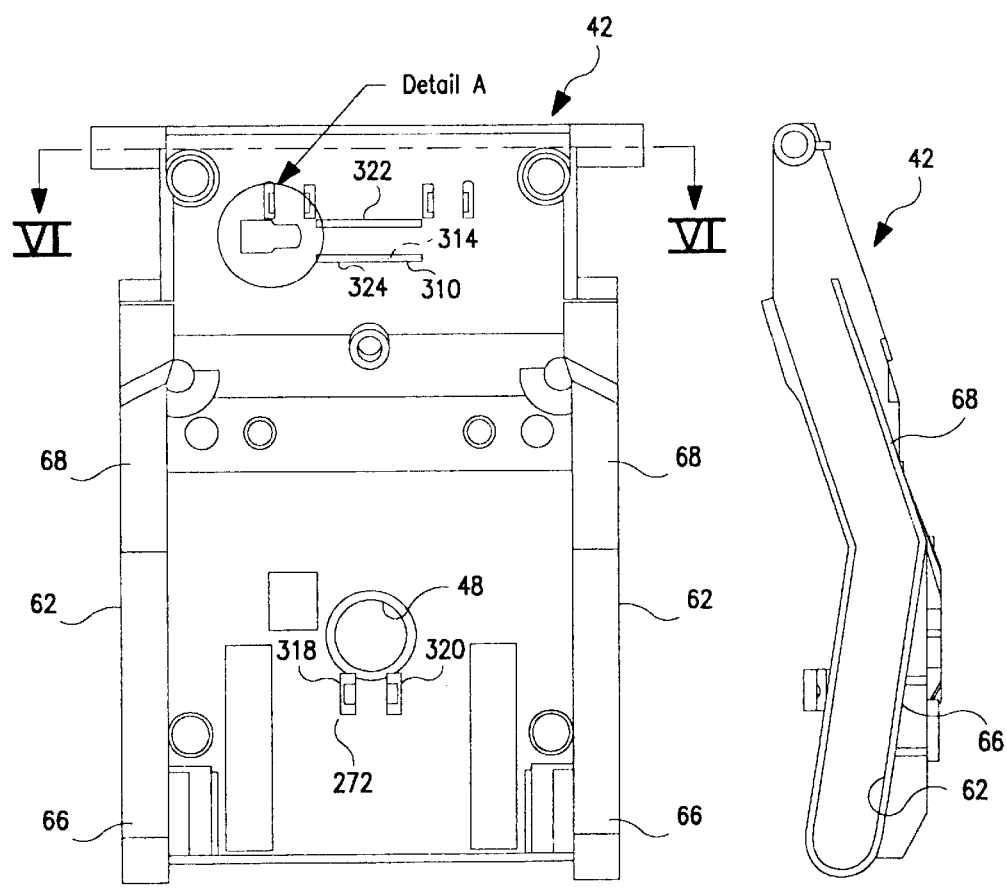

OFFICE CHAIR

This application is a continuation-in-part of U.S. patent application Ser. No. 09/769,967, filed on Jan. 25, 2001, by Timothy P. Coffield et al, entitled LOAD BEARING FABRIC ATTACHMENT AND ASSOCIATED METHOD still pending.

BACKGROUND OF THE INVENTION

The present invention relates to seating, and more particularly to office and task seating.

To enhance comfort and provide improved ergonomic function, office and task seating is typically provided with a high degree of adjustability. For example, it is common to provide mechanisms for adjusting the height of the seat, the location of the armrest and the degree of lumbar support.

Another common feature provided in some office and task seating is a resilient back recline. The resilient back recline permits the back to tilt or recline rearwardly in a resilient manner under force applied by the occupant. For example, the resilient back recline permits the back to recline rearwardly when an occupant leans backward in the chair. Typically, the back recline mechanism is spring-loaded to provide a desired level of resistance to rearward movement and to return the back to the default or home position when the occupant leans forward.

One particularly advantageous adjustment mechanism is shown in U.S. Pat. No. 4,842,333 to Meiller, which is incorporated herein by reference. The Meiller mechanism operatively links the seat and back portions of the chair so that tilting of the back results in forward and rearward movement of the seat. This mechanism significantly reduces the amount of change in the occupant's visual and reach zones when he or she reclines in the chair. It also provides substantially uniform spacing between the seat and back through various degrees of inclination, thereby reducing the tendency of the back to "untuck" the occupant's shirt with each reclining movement.

There is also an ongoing effort to reduce the complexity of operating the control mechanisms for the various components of the chair. Conventional controls typically require operation of numerous knobs, levers and other actuators to adjust the chair. The level of complexity of many conventional controls is such that locating and operating the appropriate actuator for a given adjustment feature can present significant problems. Further, many control mechanisms require substantial physical effort to operate. For example, conventional rotary controls often require numerous complete rotations of a control knob to move the component through its complete range of motion. This effort can be particularly difficult for the aged and those suffering from arthritis, carpal tunnel syndrome or other similar problems. Similar concerns exist in connection with conventional armrest adjustment mechanisms. There is an ongoing need for a reliable and inexpensive adjustment mechanism that is easily operated and provides a high degree of adjustability.

It is also increasingly common to use load bearing fabric in the seat and back of conventional office seating. In load bearing fabric constructions, the load bearing surfaces of the seat and back are defined by a fabric that is stretched over a corresponding opening. The load bearing fabric not only supports the occupant, but also has enough resiliency to provide the desired level of comfort. In typical constructions of this type, no additional cushioning or trim is required in the load bearing regions of the seat and back. Because of the open weave or knit construction of many load bearing fabrics, the seat and back of the load bearing constructions is typically see-through. This means that any lumbar support or other mechanisms secured to the back or seat will be visible during ordinary use of the chair. As a result, there is an ongoing need for a lumbar support that is not only effective in controlling the contour of the lumbar region, but also aesthetically pleasing.

Further, conventional seating manufacturers often provide a line of chairs, rather than a single chair, to meet various specific needs. For example, a line of chairs may include both a task chair and an executive chair; with the task chair designed to meet a lower price point having a relatively small back and sometimes limited adjustability. The executive chair may be design for a higher price point, typically having a larger back and being fully adjustable. This requires the separate design and manufacture of different chair backs, thereby reducing the manufacturing efficiencies associate with larger volumes.

SUMMARY OF THE INVENTION

The aforementioned problems are overcome by the present invention wherein a chair is provided with mechanisms that permit a wide range of adjustability of the chair. The chair generally includes an adjustable resilient back recliner mechanism, a pair of adjustable armrests, modular upper back portions and an adjustable lumbar support.

In a first aspect of the invention, the present invention provides a control mechanism that permits simple adjustment of various elements of the chair. In a preferred embodiment, the control mechanism includes a tension knob that is rotated to provide control over the tension in the resilient back recline mechanism, a height push-button that controls the height of the seat and a multi-position limit lever that provides control over the limit of the resilient back recline mechanism.

In a more preferred embodiment, the tension knob provides a full range of adjustment through only 180 degrees of rotation of the knob. More specifically, the chair includes a spring that provides tension in the back recliner mechanism. The tension knob is operatively connected to the spring by a cam, lever and linkage. Rotation of the tension knob causes the cam to pivot the lever, which in turn varies the pretension in the spring through operation of the linkage. The tension control mechanism provides a simple and effective control mechanism that is easily moved through its entire range of motion without undue effort.

In another preferred embodiment, the height push button operates a wing that actuates a toggle switch protruding from the top of the upper tube of the support column. The height push button is preferably mounted within the tension control knob, where it is readily accessible. As a result, the height control is easily located and operated.

In another preferred embodiment, recline limit control mechanism includes a lever that is preferably mounted to the shaft of the tension control knob where it is readily accessible. The lever is operatively connected to a rotor that extends and retracts a cable in response to rotation of the lever. The cable is connected to a stop that travels in the path of a trackway on the seat frame to limit movement of the seat frame and consequently the back. The recline limit control mechanism is simple and effective, yet provides a high degree of adjustability to the recline limit. The recline limit lever is mounted adjacent the tension knob and height control so that the various seat controls are arranged in a single location, where they are easily located and operated by the occupant.

In a second aspect, the present invention provides a lumbar support that includes a lumbar pad and a lumbar cam. In a preferred embodiment, the lumbar cam includes lobes of differing dimensions arranged along a shaft. The shaft is rotatably mounted to the lumbar pad, thereby permit adjustment of the contour of the lumbar region by rotation of the lumbar cam. In a more preferred embodiment, the lumbar pad and lumbar cam are exposed and visible to the occupant. In an even more preferred embodiment, the lumbar support is height adjustable. More specifically, the lumbar pad and lumbar cam are movably mounted within a vertical channel. The lumbar support provides a high level of vertical and depth adjustment to the lumbar region through simple rotation of the lumbar cam. The degree of adjustability can easily be adjusted by variations in the lobes of the lumbar cam. Further, the exposed lumbar support is aesthetically pleasing and permits visual inspection of its components.

In a third aspect, the present invention provides an armrest control mechanism that permits adjustment of the height and angle of the armpads. In a preferred embodiment, the armrest control mechanism for each armrest includes a tube movably mounted in an upright and a ratchet mechanism that permits the height of the tube in the upright to be raised simply by lifting the armpads. The ratchet mechanism preferably includes a reset mechanism that permits each tube to be lowered only after it has been raised to its upper extreme. The armrest height control mechanism provides a high degree of vertical adjustment and, because there are no actuators, is easily operated simply by lifting or lowering the armpads.

The armrest control mechanism also preferably includes an armpad pivot mechanism that permits pivotal adjustment of the armpads. The pivot mechanism generally includes a lower plug that carries the plunger of the ratchet mechanism and an upper plug that is affixed to the tube and rotatably mounted to the lower plug. The pivot mechanism permits the tube, and hence the armpad, to be rotated without rotating the plunger. This mechanism provides a high degree of adjustability and is easily incorporated with the armrest height control mechanism.

In a fourth aspect, the present invention provides a modular back assembly that permits variation in the overall shape of the back through the installation of interchangeable upper back portion components. In a preferred embodiment, the back defines a mounting platform that is adapted to receive any of a variety of upper back portions through a snap-fit connection. The mounting platform is preferably disposed at the upper extreme of the back such that the overall shape and height of the back is readily varied by differently shaped upper back portion components. The modular upper back portion permits inexpensive variation in the overall shape of the back, thereby eliminating the need for the design, development and manufacture of entirely different backs to meet different price points.

These and other objects, advantages, and features of the invention will be readily understood and appreciated by reference to the detailed description of the preferred embodiment and the drawings.

BRIEF DESCRIPTION OF THE DRAWINGS

FIG. 4 is a top plan view of the casting;

FIG. 5 is a side elevational view of the casting;

FIG. 6 is a sectional view of the casting taken along line VI—VI of FIG. 4;

DETAILED DESCRIPTION OF THE PREFERRED EMBODIMENT

I. General Description

A chair in accordance with a preferred embodiment of the present invention is shown in FIGS. 1–2 and 51–55, and generally designated 10. In a preferred embodiment, the load bearing surfaces of the chair 10 are defined by load bearing fabric rather than conventional cushion and fabric constructions. The chair 10 is, however, illustrated with the load bearing fabric removed in all but FIG. 1 to show the structure of the present invention. The loading bearing fabric attachment of the preferred embodiment is described in detail in U.S. patent application Ser. No. 09/769,967, entitled LOAD BEARING FABRIC ATTACHMENT AND ASSOCIATED METHOD, which was filed on Jan. 25, 2001, by Timothy P. Coffield et al, which is incorporated herein by reference. Although the present invention is described in connection with a chair incorporating load bearing fabric, the present invention is well suit for use in other constructions, for example, conventional cushion and fabric construction.

Figure 18:
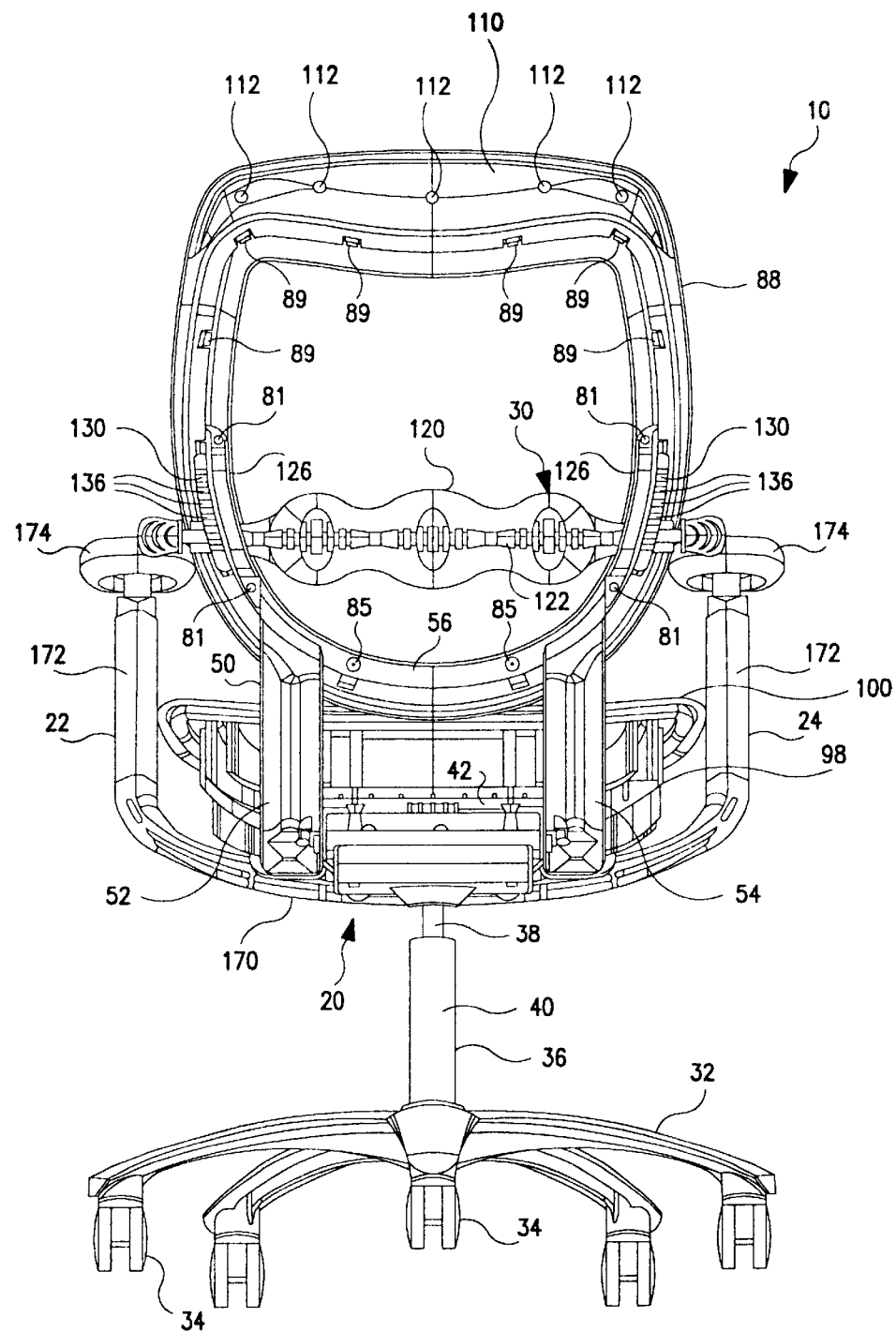
FIG. 18 is a rear elevational view of the chair.
Figure 19:
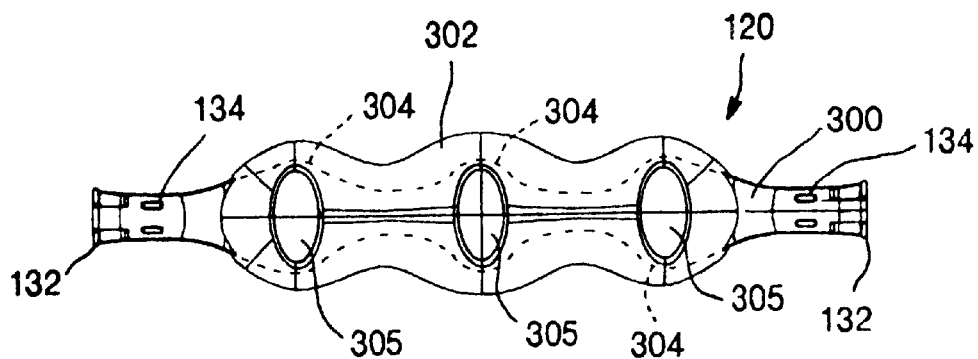
FIG. 19 is a rear elevational view of the lumbar pad.
Figure 20:
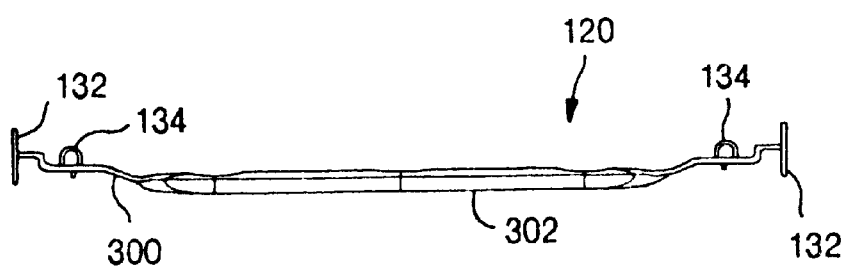
FIG. 20 is a top plan view of the lumbar pad.
Figure 21:
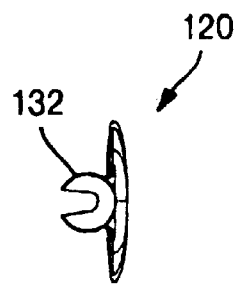
FIG. 21 is a side elevational view of the lumbar pad.
Figure 22A:
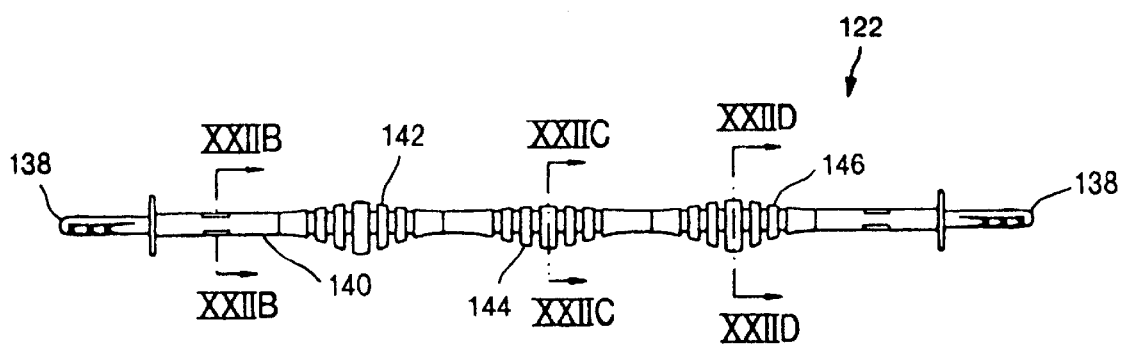
FIG. 22a is a top plan view of the lumbar cam.
Figure 41:
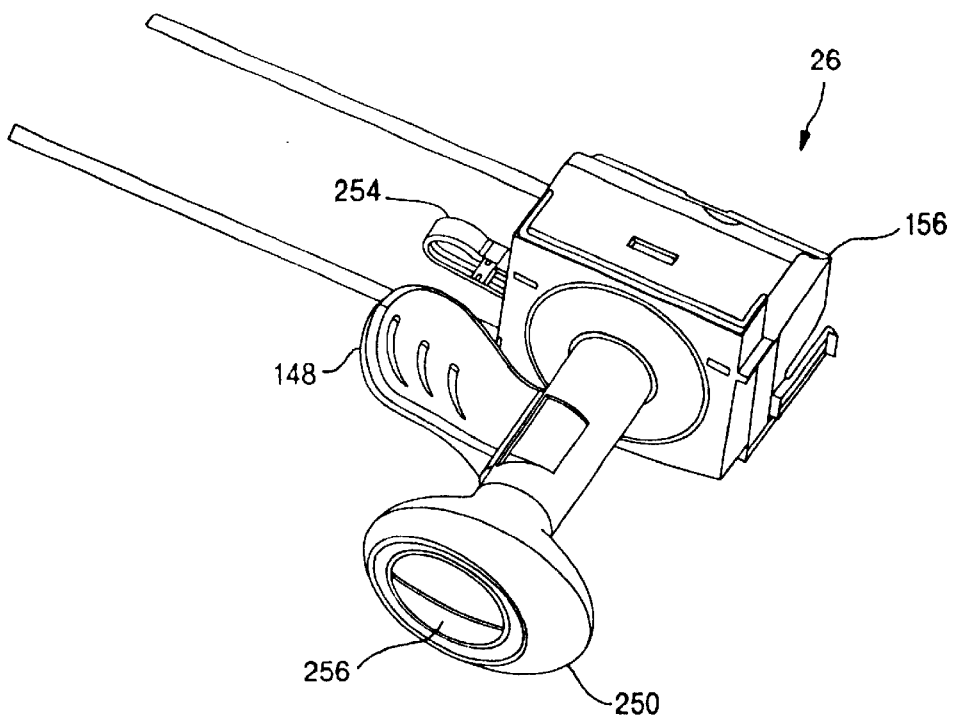
FIG. 41 is a perspective view of the controls and control housing of the control mechanism.
Figure 42:
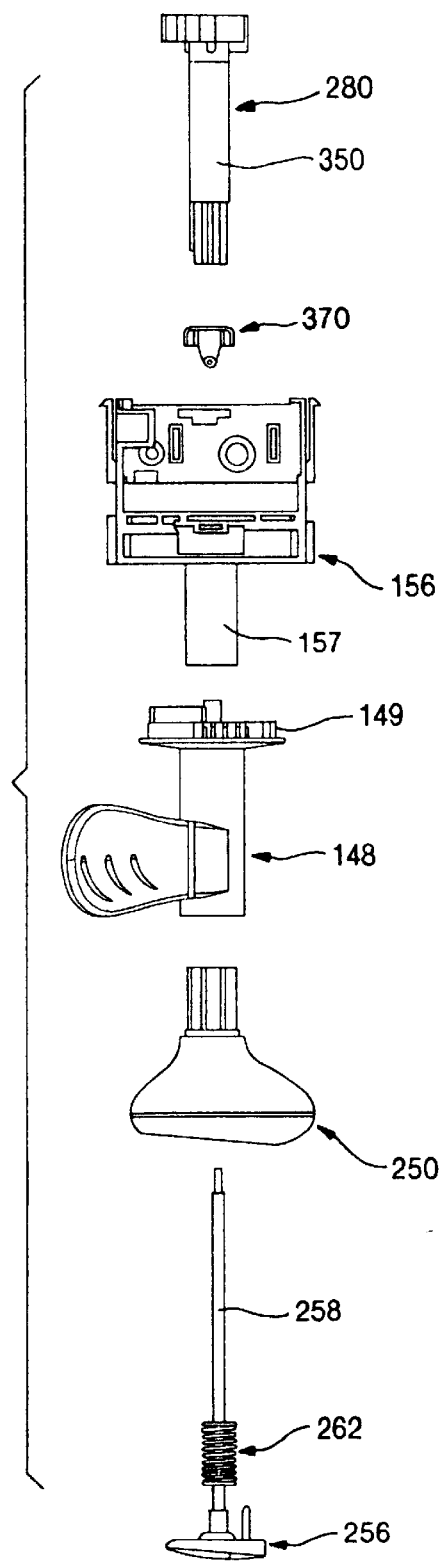
FIG. 42 is an exploded perspective view of the controls and control housing of the control mechanism.
Figure 43:
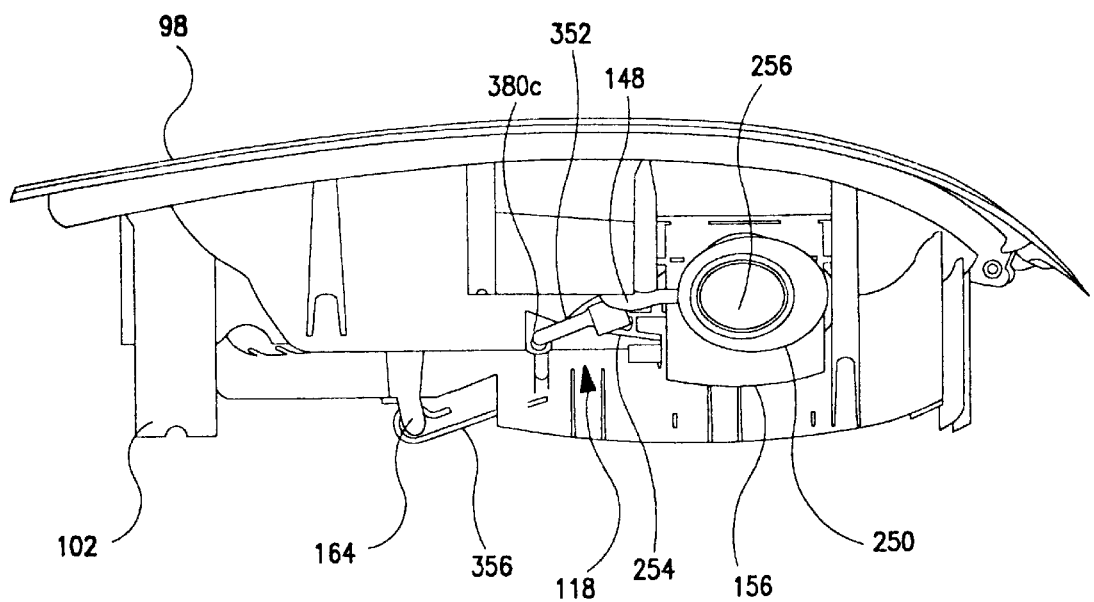
FIG. 43 is a side elevational view of the chair with portions removed to show the tension control linkage.

In general, the chair 10 includes a seat 12, a back 14 and an armrest assembly 16 mounted atop a height-adjustable pedestal 18. The seat 12 and back 14 are movably mounted upon a recliner mechanism 20 that permits the back 14 to recline and the seat 12 to shift forwardly and rearwardly in concert with reclining movement of the back 14 (See FIGS. 1, 18 and 52). Referring now to FIG. 18, a lumbar support 30 is movably mounted to the back 14 in the lumbar region. The lumbar support 30 is height-adjustable by movement of the lumbar support in a vertical track and is depth-adjustable by rotation of a lumbar cam. As perhaps best shown in FIGS. 1 and 18, the armrest assembly 16 is mounted atop the pedestal 18 so that it does not move with the seat 12 and back 14. The armrest assembly 16 includes a pair of adjustable armrests 22 and 24 disposed on opposite sides of the seat 12. The recliner mechanism 20 is mounted atop the pedestal 18 so that adjustment of the height of the pedestal 18 results in adjustment of the seat 12, back 14 and armrest assembly 16. Referring now to FIGS. 41 and 43, the chair 10 includes a control mechanism 26 that permits push-button control of the height of the chair 10, rotational control of the tension of the resilient back recliner mechanism and multi-positional lever control of the limit of the resilient back recliner mechanism. The chair 10 further includes a modular upper back portion 90 that can be replaced by alternative modular back portions, such as upper back portion 90' shown in phantom lines in FIG. 2, to vary the overall shape of the back 14.

II. Seat Structure

Figure 1:
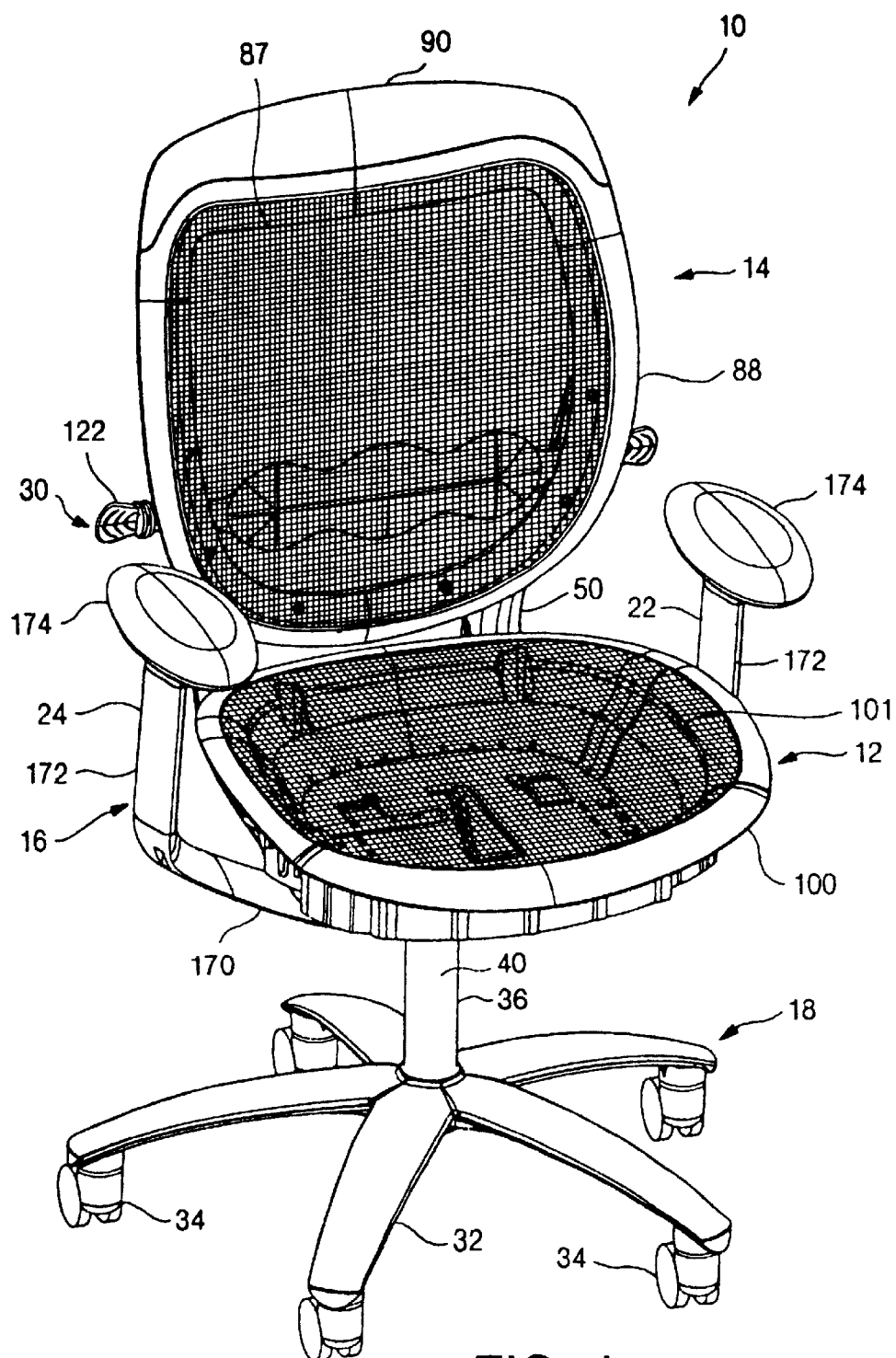
FIG. 1 is perspective view of a chair in accordance with a preferred embodiment of the present invention with the control mechanisms removed.
Figure 2:
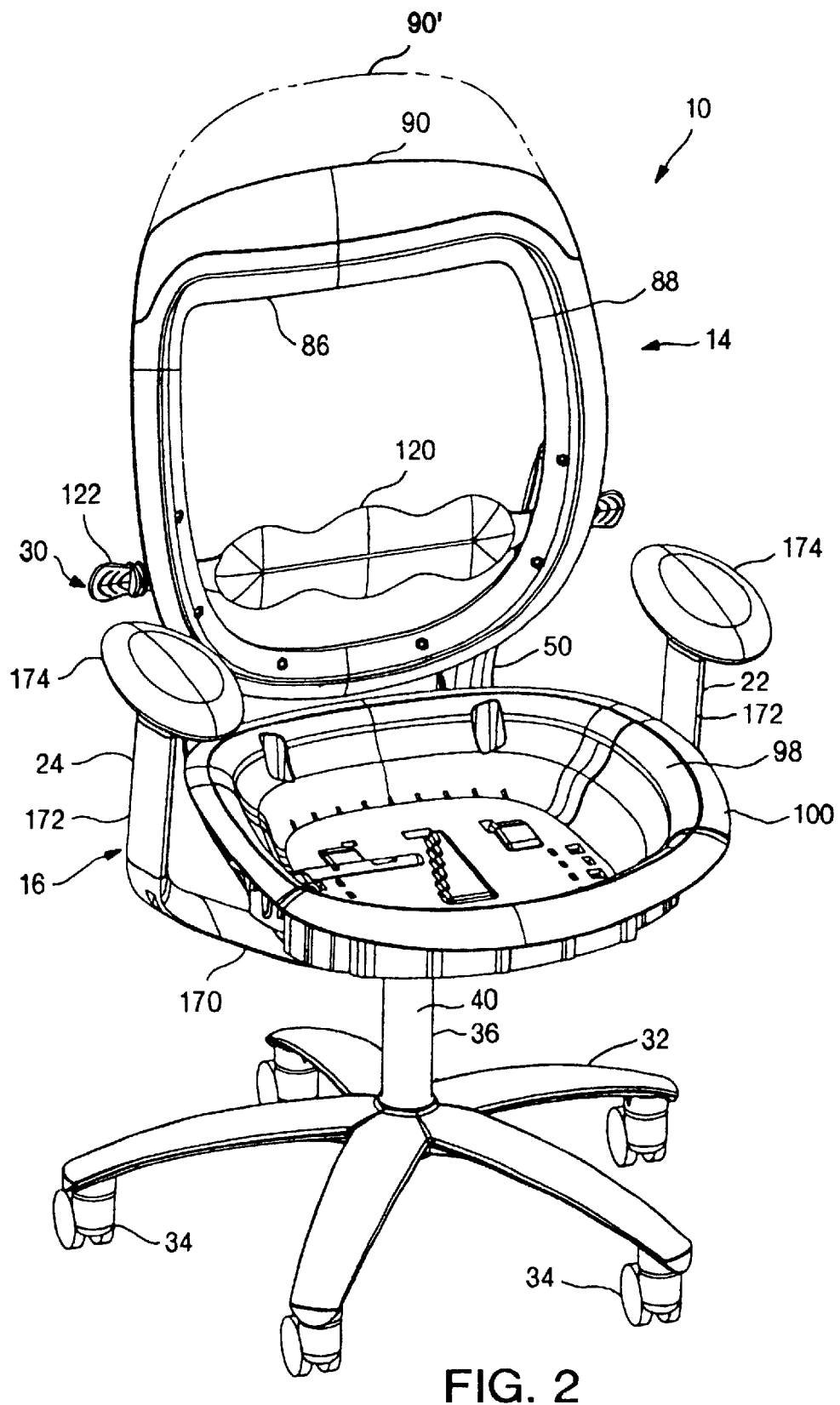
FIG. 2 is perspective view of a chair with the control mechanisms and load bearing fabric removed.

As noted above, the seat 12, back 14 and armrest assembly 16 are mounted atop a height-adjustable pedestal 18. As shown in FIG. 1, the pedestal 18 preferably includes five legs 32 terminating in casters 34 and a support column 36 extending upwardly from the legs 32. The support column 36 is a generally conventional height-adjustable support column having telescopic upper 38 and lower 40 tubes. Although not shown, a spring or other biasing device is disposed within the lower tube 40 beneath the upper tube 38 to bias the upper tube 38 in an extended position. The support column 36 also includes a generally conventional height actuator (not shown) for controlling the height of the column 36 and hence the height of the seat 12. The height actuator (not shown) is contained within the support column 36 and includes a toggle switch 37 that protrudes from the upper end of the upper tube 38. Actuation of the toggle switch 37 releases the locking mechanism of the height actuator, thereby permitting adjustment of the height of the support column 36 in a conventional manner. The height actuator is operated by the height control mechanism 160, as will be described in more detail below. The described pedestal 18 is merely exemplary, and it can be replaced by any of a wide variety of conventional pedestals as desired.

The seat 12, back 14 and armrest assembly 16 are mounted to the pedestal 18 upon a recliner mechanism 20. The recliner mechanism 20 permits the back 14 to recline while linking the seat 12 to the back 14 so that the seat slides forwardly and rearwardly as the back 14 moves. The general operation of the recliner mechanism 20 is similar to that of the mechanism disclosed in U.S. Pat. No. 4,842,333 to Meiller, which is incorporated herein by reference. The recliner mechanism 20 generally includes a casting 42 that is mounted atop the support column 36 in a conventional manner. The casting 42 movably receives and supports the seat 12 and back 14 of the chair 10, in part by J-bar 50 as described in more detail below. As shown in FIGS. 3–6, the casting 42 is a generally horizontally extending plate including a pair of roller bearing tracks 62 disposed on opposite lateral sides. The tracks 62 open in opposite directions and are adapted to receive roller bearings mounted to the J-bar 50. Each track 62 includes forwardly inclined rear portion 66 and a rearwardly inclined forward portion 68 that cooperatively define a shallow V-shaped channel. The rear portions 66 receive and shepherd the rear roller bearings 60 of the J-bar 50. The forward portions 68 receive and shepherd the front roller bearings 58 of the J-bar 50. The configuration and operation of the J-bar 50 is described in more detail below. The casting 42 farther includes a pair of front roller bearings 70 that support the front of the seat 12. The front roller bearings 70 are mounted to opposite lateral sides at the forward edge of the casting 42 and are preferably mounted upon pins 74. The pins 74 are mounted, preferably by press-fitting, within bores 75 (See FIG. 6). The casting 42 also includes a centrally located mount 48 that fitted over the upper tube 38 of the support column 36. The casting 42 may be secured to the upper tube 38 by a set screw, snap ring, retaining clip or other conventional retaining device (not shown). The casting 42 also includes a plurality of mounting components for various control mechanisms. More specifically, the casting 42 includes a height control clevis 272 adjacent to the mount 48 (See FIG. 4), a recline limit track 310 extending in a left/right direction across a portion of the casting 42 (See FIG. 4), and a spring plate mount 312 disposed at the rear of the casting 42 (See FIG. 3). The height control clevis 272 generally includes a pair of spaced uprights 318 and 320 that retain wing 264. The recline limit track 310 generally includes a pair of spaced walls 322 and 324, at least one of which preferably includes a longitudinally extending notch 314 that entraps a corresponding retaining rib 316 on stop 150. The function of these mounting components is described in more detail below. The casting 42 may also include top 44 and bottom 46 shrouds that enclose a portion of the casting 42. The casting 42 is preferably cast from aluminum or other conventional materials, but may be machined or otherwise manufactured as desired.

Figure 7:
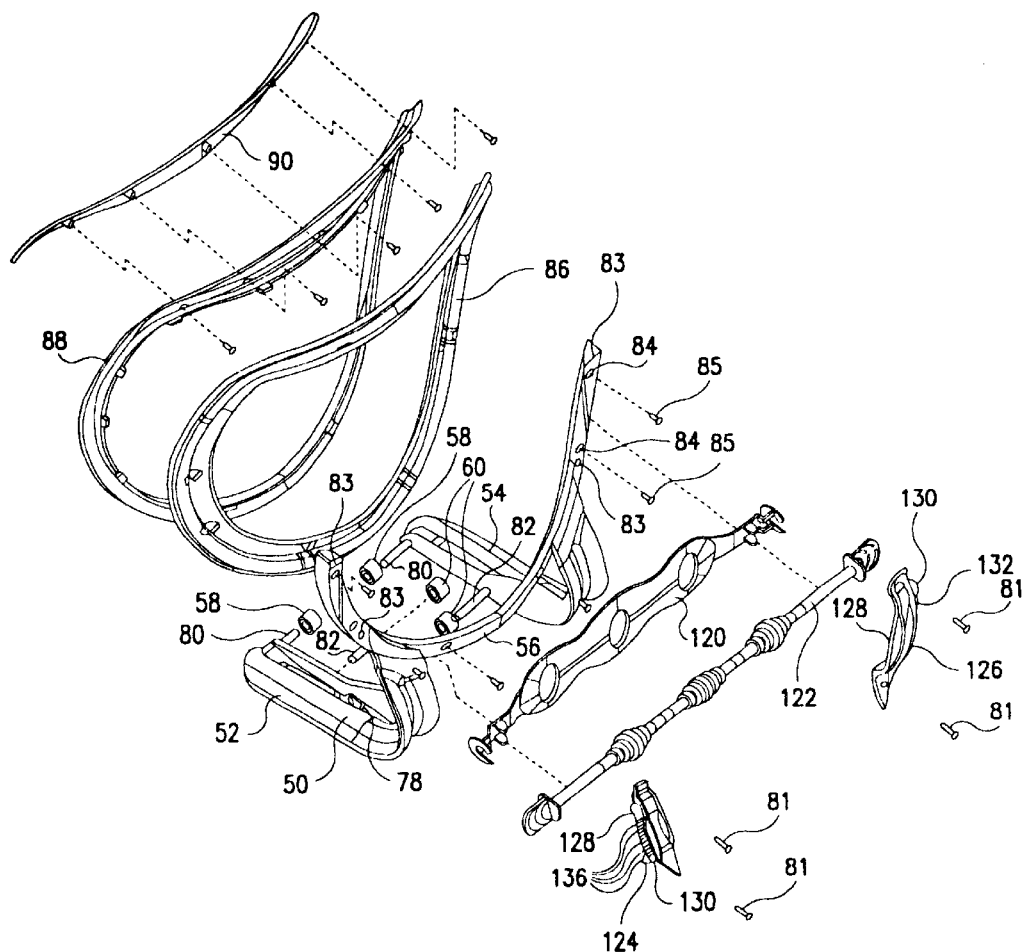
FIG. 7 is an exploded perspective view of portions of the J-bar, back and lumbar support.
Figure 8:
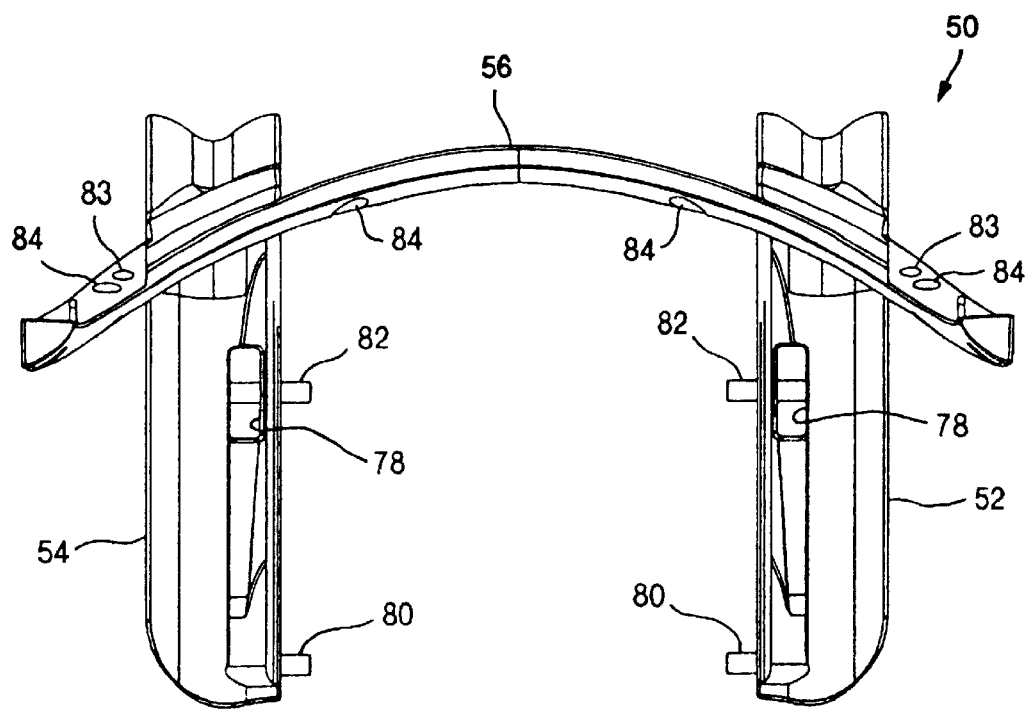
FIG. 8 is a top plan view of the J-bar.

J-bar 50 mounts the back 14 and the rear portion of the seat 12 to the casting 42. As shown in FIGS. 7 and 8, the J-bar 50 includes a pair of L-shaped recliner legs 52 and 54 extending from a U-shaped back support 56. A front roller bearing 58 and a rear roller bearing 60 are mounted to the interior of each leg 52 and 54 upon corresponding front 80 and rear 82 pins. When assembled, the roller bearings 58 and 60 are received within the roller bearing tracks 62 of the casting 42. More specifically, the front rollers 58 are received within the front portions 68 and the rear rollers 60 are received within the rear portions 66. Each leg 52 and 54 defines a seat mounting slot 78 that is aligned with the corresponding rear pin 82. In the preferred embodiment, the back support 56 defines a plurality of back mounting holes 84 for securing the back 14 to the back support 56 by screws 85 or other conventional fasteners, as well as a plurality of lumbar mounting holes 83 for securing the lumbar support 30 to the back support 56 by screws 81 or other conventional fasteners. The J-bar 50 is preferably cast from aluminum or other conventional materials, but may be machined or otherwise manufactured as desired. The pins 80 and 82 are preferably manufactured from steel and are preferably press-fitted into corresponding holes in the J-bar 50.

Figure 9:
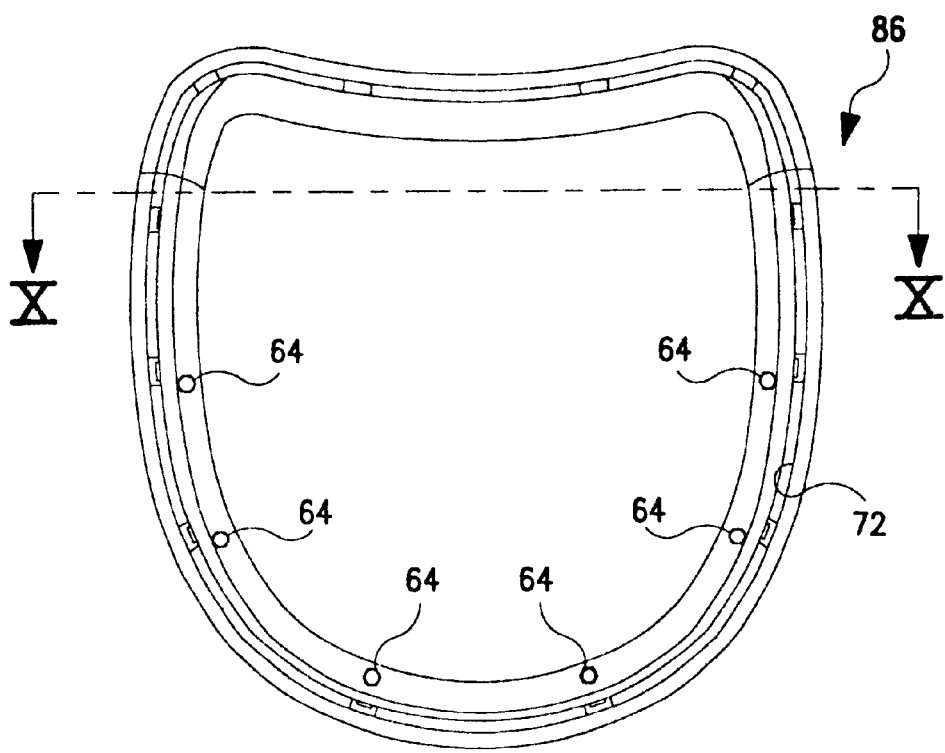
FIG. 9 is a top plan view of the back frame.
Figure 10:
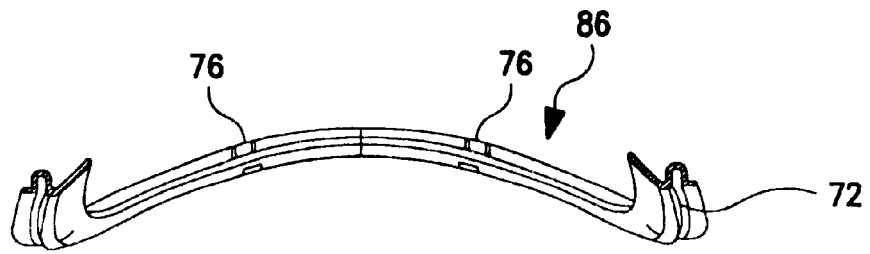
FIG. 10 is a sectional view of the back frame taken along line X—X of FIG. 9.
Figure 11:
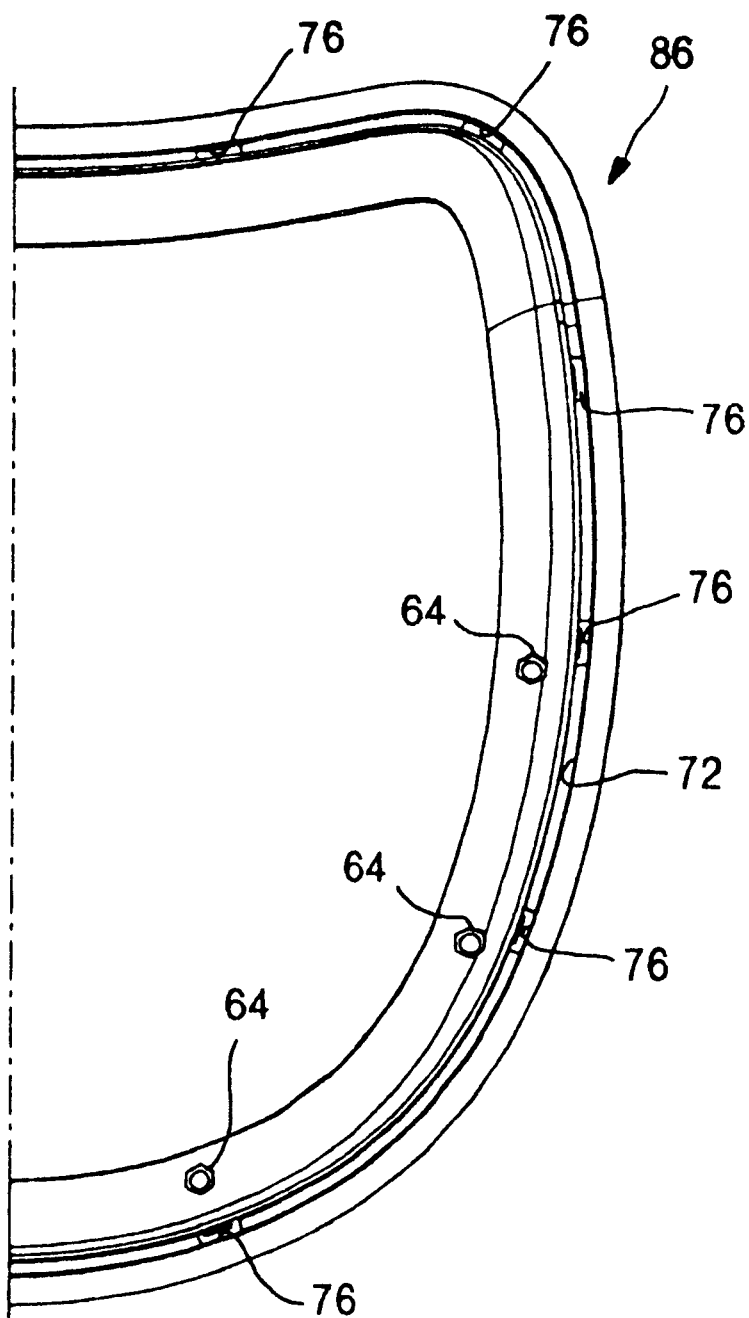
FIG. 11 is an enlarged view of a portion of the back frame.

As perhaps best shown in FIG. 7, the back 14 generally includes a back frame 86, a back carrier 88 and a lumbar support 30. Referring now to FIG. 9, the back frame 86 is a peripheral framework receiving and providing structural support for the back carrier 88. The back frame 86 defines a channel 72 extending entirely around the peripheral framework. The back frame 86 defines a plurality of slots 76 spaced around the base of the channel 72 for use in securing the back carrier 88 to the back frame 86 as described in more detail below (See FIG. 11). The back frame 86 also includes a plurality of screw bosses 64 for use in securing the back frame 86 to the J-bar 50 by screws. The back frame 86 is preferably injection molded from a material having sufficient structural characteristics to support the back carrier 88 and the associated loads. For example, the back frame 86 may be manufactured from thirty percent glass-filled polypropylene or from nylon.

Figure 12:
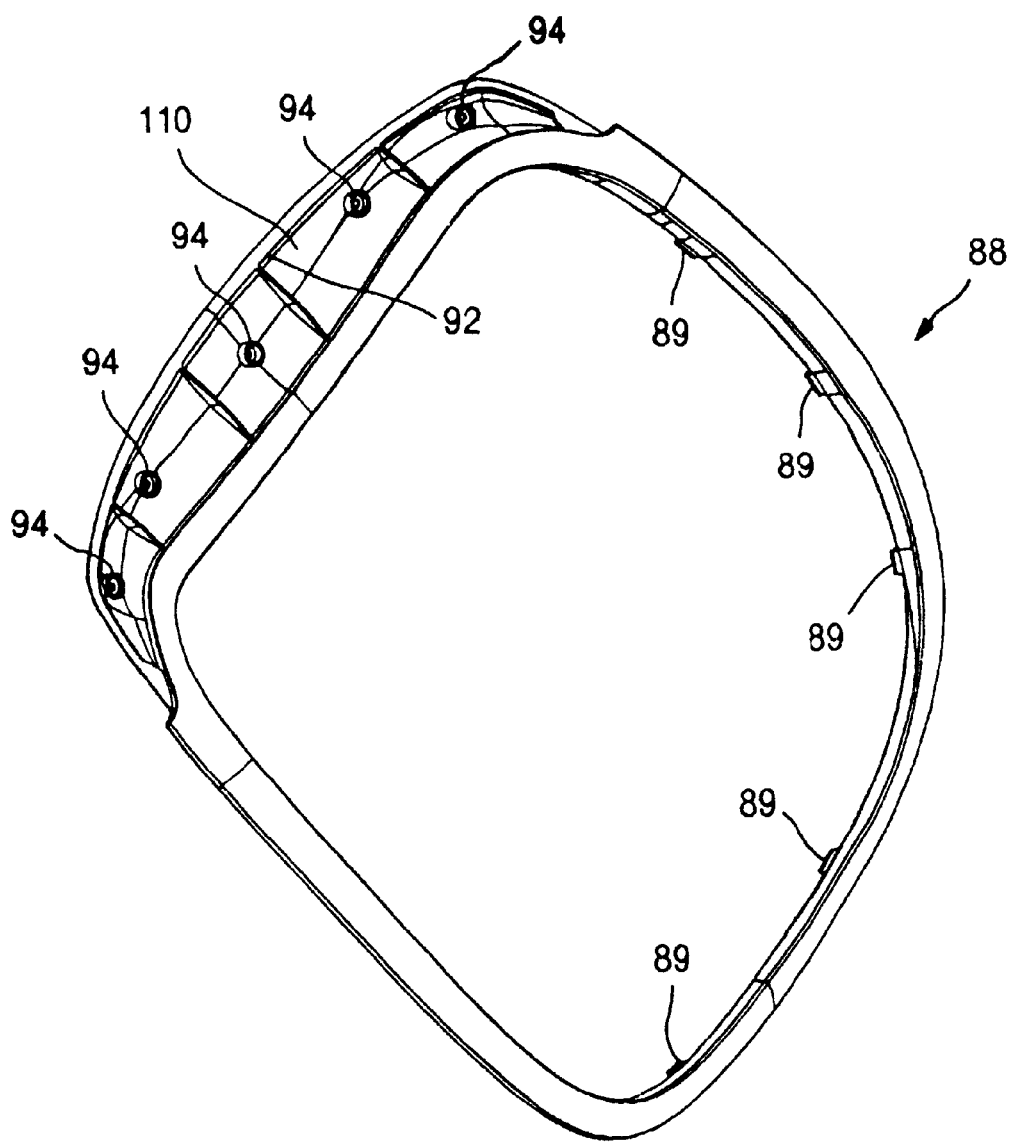
FIG. 12 is a perspective view of the back carrier.
Figure 13:
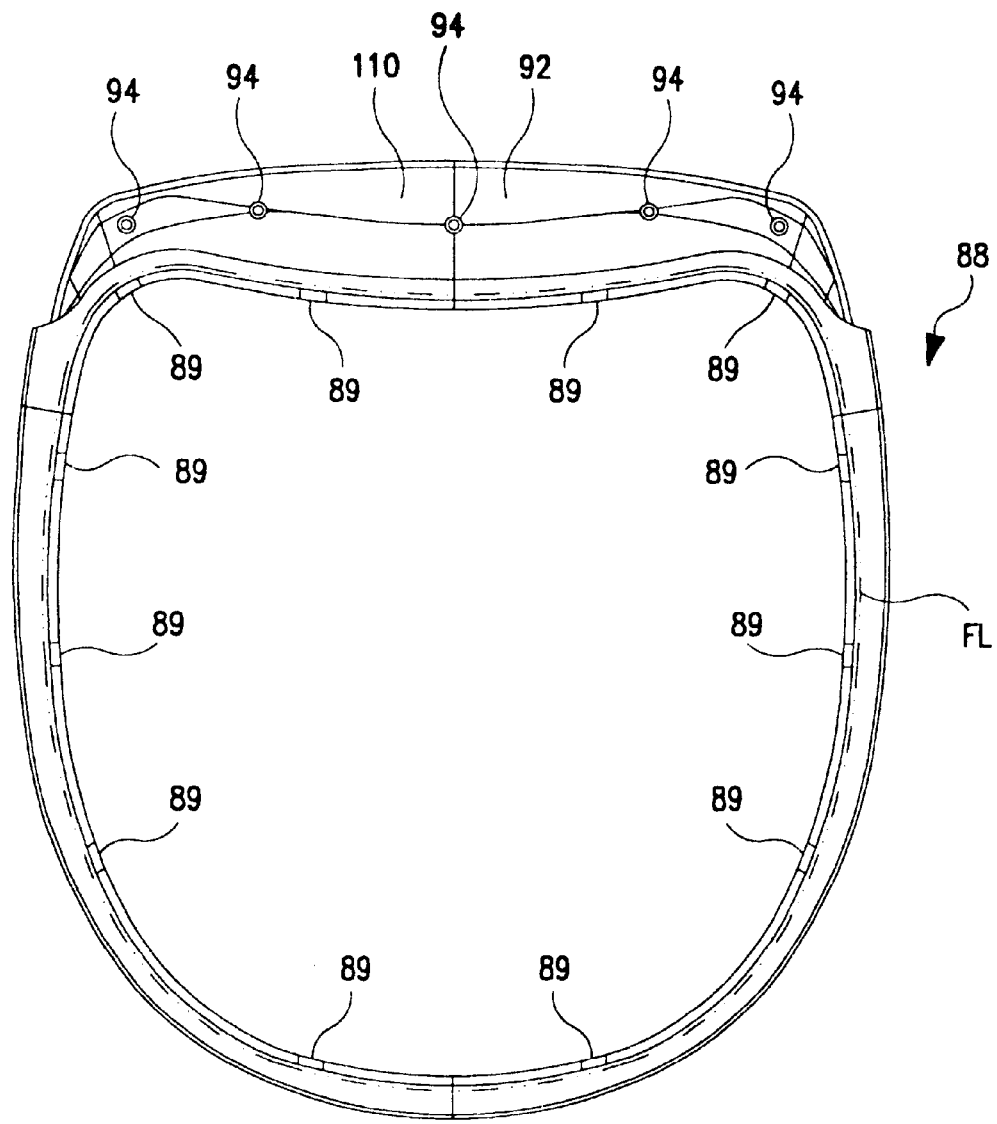
FIG. 13 is a front elevational view of the back carrier.
Figure 14:
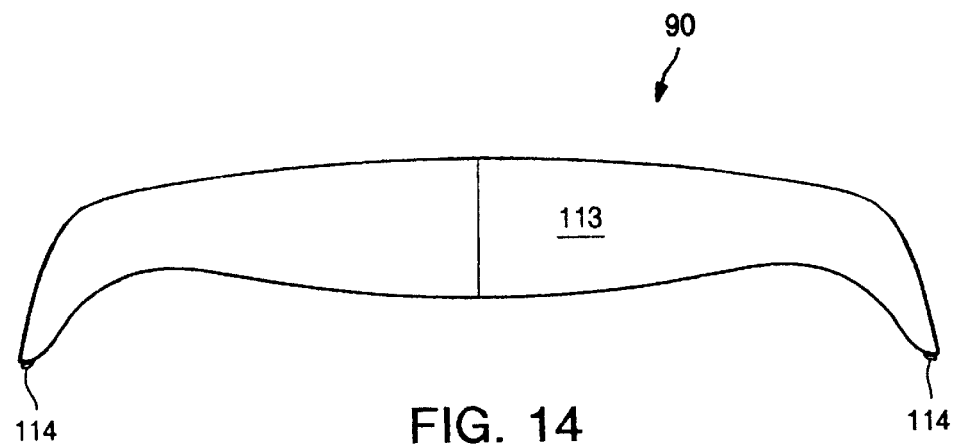
FIG. 14 is a front elevational view of a modular upper back portion.
Figure 15:
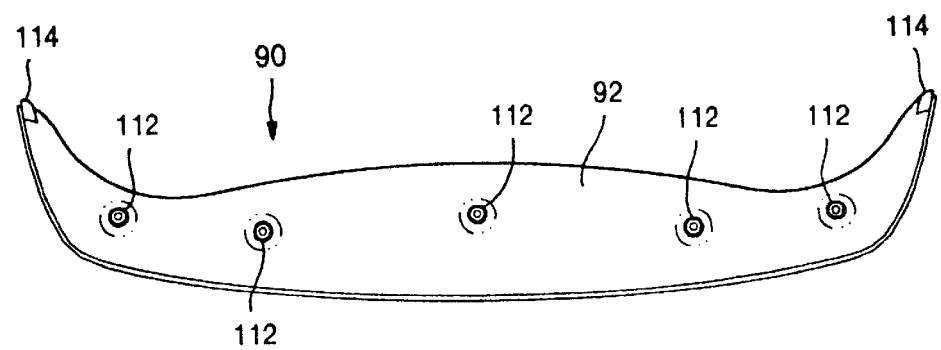
FIG. 15 is a rear elevational view of the modular upper back portion.
Figure 16:
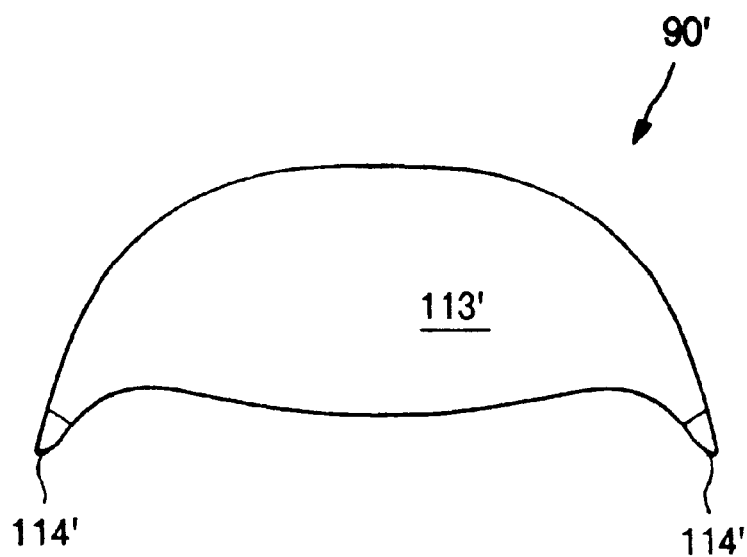
FIG. 16 is a front elevational view of an alternative modular upper back portion.
Figure 17:
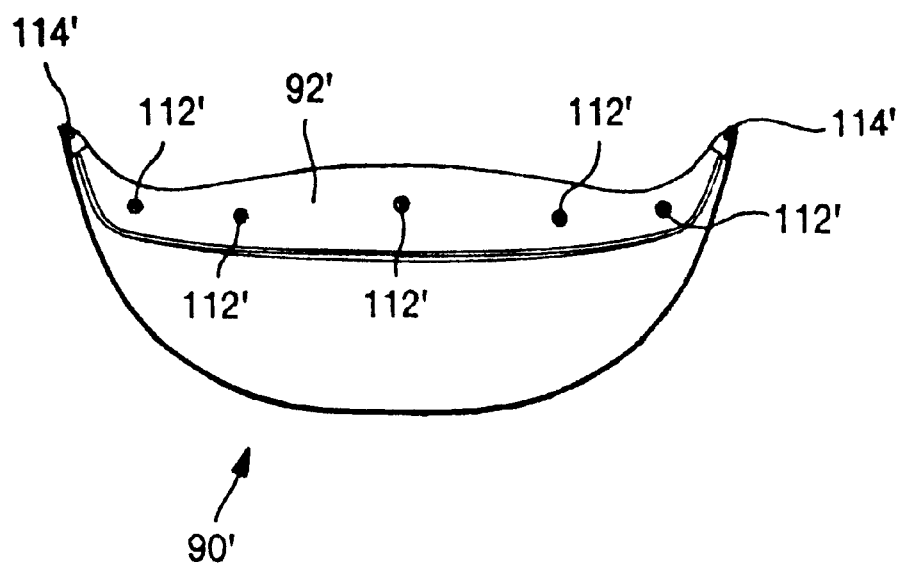
FIG. 17 is a rear elevational view of the alternative modular upper back portion.

As noted above, the back carrier 88 is secured to the back frame 86 within the channel 72 and includes a modular upper back portion 90 that permits adjustment of the shape of the upper portion of the back 14. The back carrier 88 is shown in FIGS. 12 and 13 with the load bearing fabric removed to provide a clearer understanding of the subject matter of the present invention. Certain aspects of the back carrier 88 are described in detail in U.S. patent application Ser. No. 09/769,967, which as noted above is incorporated herein by reference. Suffice it to say that the back carrier 88 includes a load bearing fabric 87 (See FIG. 1) that is stretched across and secured to the back carrier 88, preferably as an integral part of the back fabric carrier molding process. The phantom line FL shows the approximate position at which the fabric 87 enters the carrier 88. The back carrier 88 is fitted into channel 72 and is preferably intersecured with the back frame 86 by snaps 89 that are snap-fitted into slots 76. The snaps 89 have hooked ends that securely interlock the snaps 89 and slots 76. The back carrier 88 can, however, be secured to the back frame 86 in alternative ways, for example, by screws (not shown). Although the present invention is described in connection with a back frame 86 supporting a load bearing fabric 87, the back frame could alternatively be a conventional cushioned back or other similar construction. The back carrier 88 is preferably injection molded from a glass filled polypropylene or other similar materials.

As noted above, the back carrier 88 is adapted to receive any of a number of modular upper back portions 90, 90'. To facilitate attachment of the desired modular upper back portion, the back carrier 88 includes a mounting platform 110 that is recessed from the front surface of the carrier 88 and includes a plurality of screw bosses 94 for screwing the upper back portion 90 to the back carrier 88. By way of illustration, a pair of upper back portions 90 and 90' are shown in FIGS. 14–17. Upper back portion 90 (FIGS. 14 and 15) is intended primarily for use on task seating, while upper back portion 90' (FIGS. 16 and 17) is intended for use with executive seating. Each modular upper back portion 90, 90' includes a front surface 113, 113' that is preferably configured to align with the front surface of the back carrier 88 to provide a substantially uniform back 14. The two upper back portions 90 and 90' include identical mounting platforms 92 and 92'. Only the mounting platform 92 of upper back portion 90 will be described in detail, it being understood that the mounting platform 92' of upper back portion 90', and other modular upper back portions, is essentially identical to mounting platform 92. The mounting platform 92 is shaped to mate with the platform 110 of the back carrier 88, and includes a plurality of screw bosses 112 that align with the screw bosses 94 of the back carrier 88. The upper back portion 90 also includes a pair of tabs 114 that extend from opposite ends of the mounting platform 92 and are trapped behind the back carrier 88. The tabs 114 prevent the opposite ends of the upper back portion 90 from separating from the back carrier 88 under a rearward load. The desired upper back portion is mounted to the back carrier 88 simply by fitting the tabs 114 behind the back frame 88 and installing screws through the screw bosses 94 in the back carrier 88 into the screw bosses 112 in the upper back portion 90. If desired, the modular upper back portions could be secured to the back carrier 88 by other forms of attachment. For example, the upper back portion 90 and back carrier mounting platform 110 may be provided with snap-together fittings (not shown) that supplement or replace the screws. Although not shown, the upper back portion can be padded and upholstered as desired.

Figure 23:
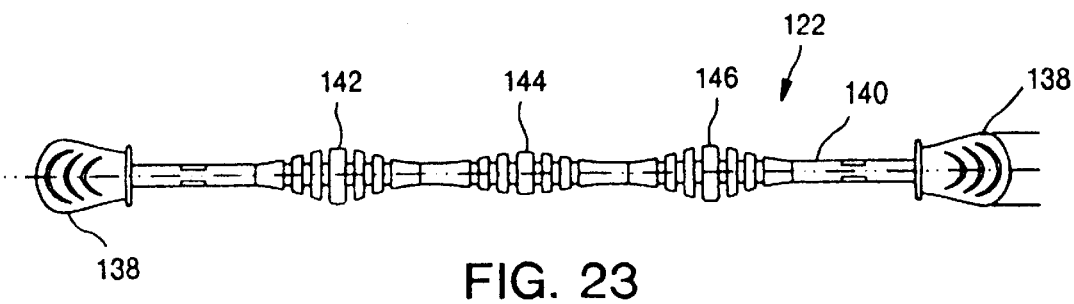
FIG. 23 is a side elevational view of the lumbar cam.
Figure 22B:
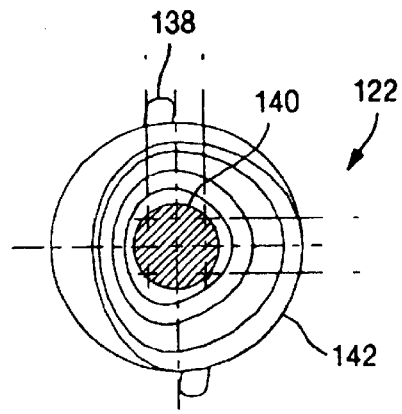
FIG. 22b is sectional view of the lumbar cam taken along XXIIB—XXIIB.
Figure 22C:
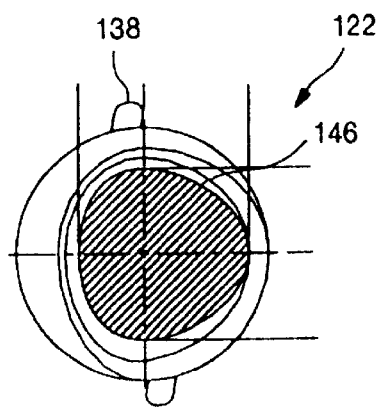
FIG. 22c is sectional view of the lumbar cam taken along XXIIC—XXIIC.
Figure 22D:
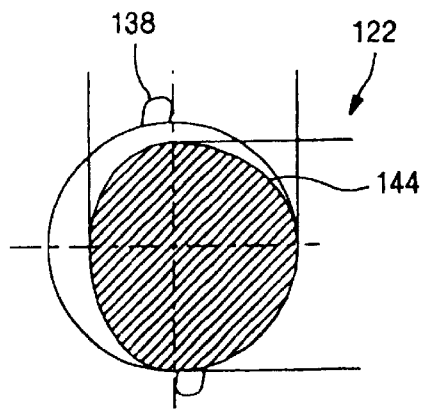
FIG. 22d is sectional view of the lumbar cam taken along XXIID—XXIID.

The back 14 also includes a lumbar support 30 that permits adjustment of the contour of the back 14 in the lumbar region. Referring now to FIGS. 7 and 18–23, the lumbar support 30 generally includes a lumbar pad 120 and a lumbar cam 122 that are mounted to the rear of the back frame 86. The lumbar pad 120 and lumbar cam 122 are mounted for vertical movement to permit adjustment of the vertical position of the lumbar support 30. The lumbar pad 120 generally includes a plastic insert 300 and a urethane overmold 302 that is molded over the insert 300. Although the insert 300 is not illustrated separately, the profile of the insert 300 is shown in broken lines in FIG. 19. The insert 300 provides the lumbar pad 120 with the desired level of rigidity and structural integrity. The insert 300 extends the entire length of the lumbar pad 120 and generally includes a plurality of discs 304 positioned between a pair of devises 132. The center portion 305 of each disc 304 is exposed through the overmold 302 for engagement with the corresponding lobe 142, 144 and 146 of the lumbar cam 122. The devises 132 are located at opposite ends of the insert 300 to receive opposite ends of the lumbar cam 122. The insert 300 also includes a pair of flanges 134 inwardly from each clevis 132. The flanges 134 cooperate with corresponding ribs on the lumbar cam 122 to bias the lumbar cam 122 in one of four distinct positions. The urethane overmold 302 is substantially resilient providing the lumbar pad 120 with the desired cushioning. The lumbar cam 122 is rotatably mounted to the lumbar pad 120, such that it can be rotated to provide the flexible lumbar pad 120 (and consequently the lumbar region of the back 14) with different shapes. Referring now to FIGS. 22 and 23, the lumbar cam 122 generally includes a pair of knobs 138 located on opposite ends of a shaft 140. The shaft 140 includes three spaced lobes 142, 144 and 146 that each vary in radius (or height) about the shaft 140. The lobes 142, 144 and 146 are shaped to provide the lumbar region of the back 14 with four different contour profiles based on the rotational position of the lumbar cam 122. The preferred cross-sectional shapes of the lobes 142, 144 and 146 are shown in FIGS. 22B, 22C and 22D. In a first position, all three lobes 142, 144 and 146 are substantially flat, providing a generally flat lumbar region. In a second position, all three lobes 142, 144 and 146 have substantial height, providing substantial support in the lumbar region. In a third position, the three lobes 142, 144 and 146 have substantially more height than in the second position, providing greater support across the lumbar region. And finally, in a fourth position, the outer lobes 142 and 146 have the same height provided in the third position while the center lobe 144 is provided with the same height as in the second position, providing substantial support in the center of the lumbar region and greater support in the outer portions of the lumbar region. It should be noted that the number and shape of the lobes may vary from application to application to provide the lumbar with the desired adjustability. The lumbar cam 122 is preferably injection molded from a substantially rigid polymeric material, such as acetal. The material is selected to provide the lumbar cam 122 will a limited degree of flexibility under conventional loads. The knobs 138 are preferably overmolded with a softer rubber or polymeric material, such as kraton, to provide the desired feel. The lumbar support 30 may be painted using conventional in-mold coating techniques. For example, the lumbar pad 120 and/or lumbar cam 122 can be painted by applying an in-mold paint to the interior surfaces of the mold parts prior to the injection molding process so that the paint is molded directly in place on the component.

Referring now to FIGS. 7 and 18, the lumbar pad 120 and lumbar cam 122 are secured to the back frame 86 by brackets 124 and 126. The brackets 124 and 126 are preferably secured to the back frame by screws 81 or other conventional fasteners, and each defines a vertically extending channel 128 that receives the lumbar pad 120 and the lumbar cam 122. The lumbar pad 120 and the lumbar cam 122 are slidably entrapped within the channels 128. Each bracket 124 and 126 also includes a ribbed vertical adjustment flange 130 that extends along the channel 128. As a result of their interference, the ribs 136 arranged along the flange 130 function to bias the lumbar 120 and lumbar cam 122 in one of seven predetermined vertical positions. The described brackets are merely exemplary and may be varied from application to application to provide the lumbar with the desired adjustability. For example, the location of the brackets, the size of the channel and the number, size and shape of vertical adjustment flanges may vary to alter the adjustability profile of the lumbar support.

Figure 3:
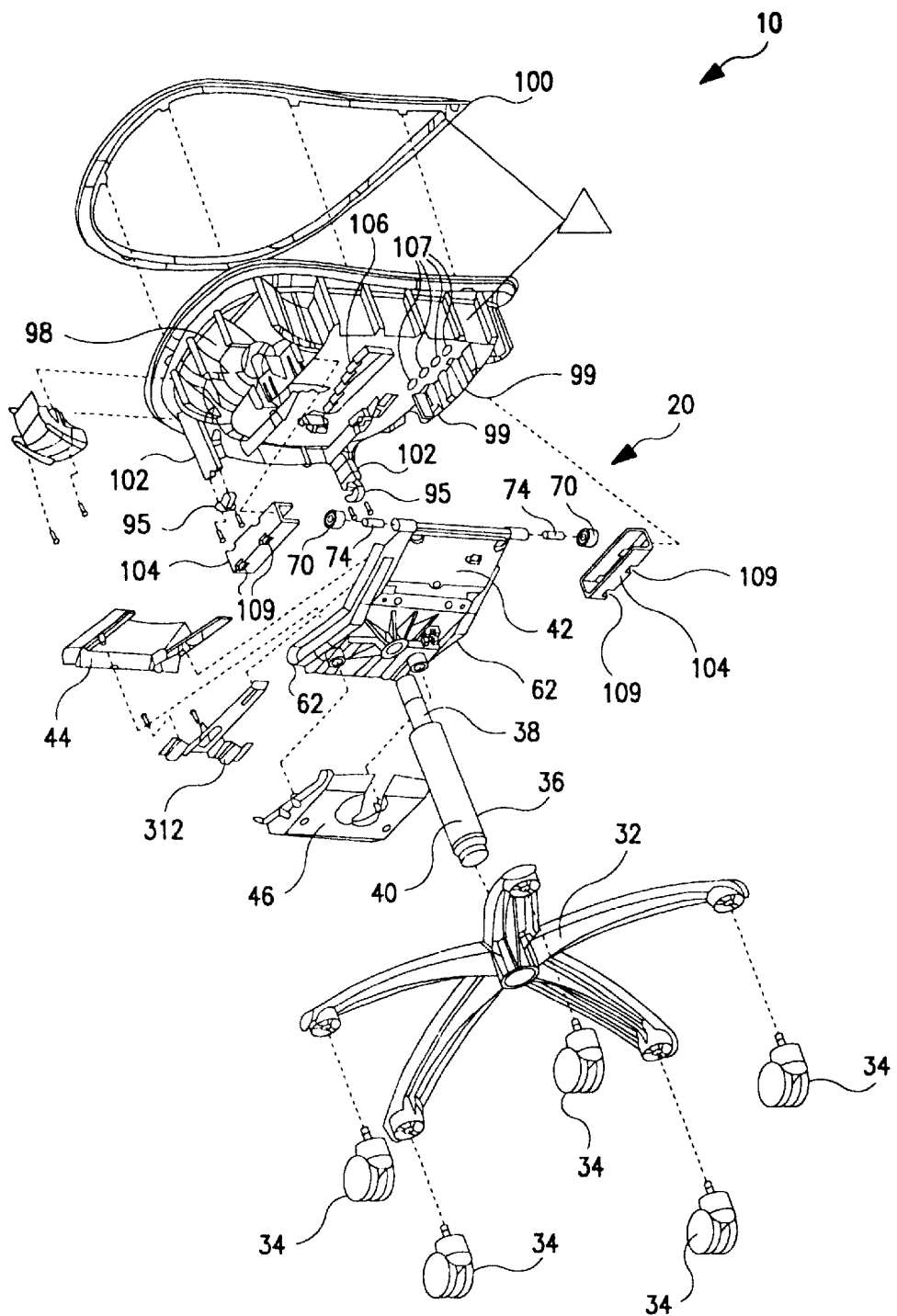
FIG. 3 is an exploded perspective view of portions of the pedestal, recliner mechanism and seat.
Figure 24:
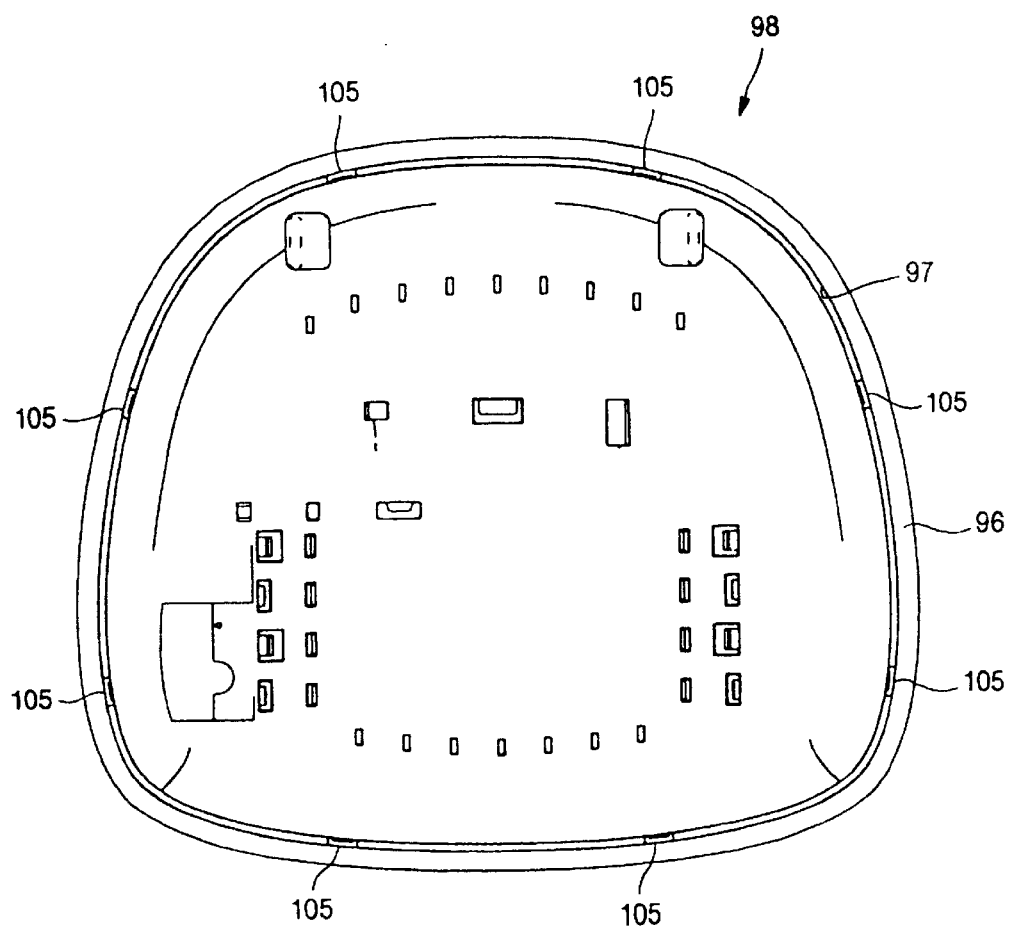
FIG. 24 is a top plan view of the seat frame.
Figure 25:
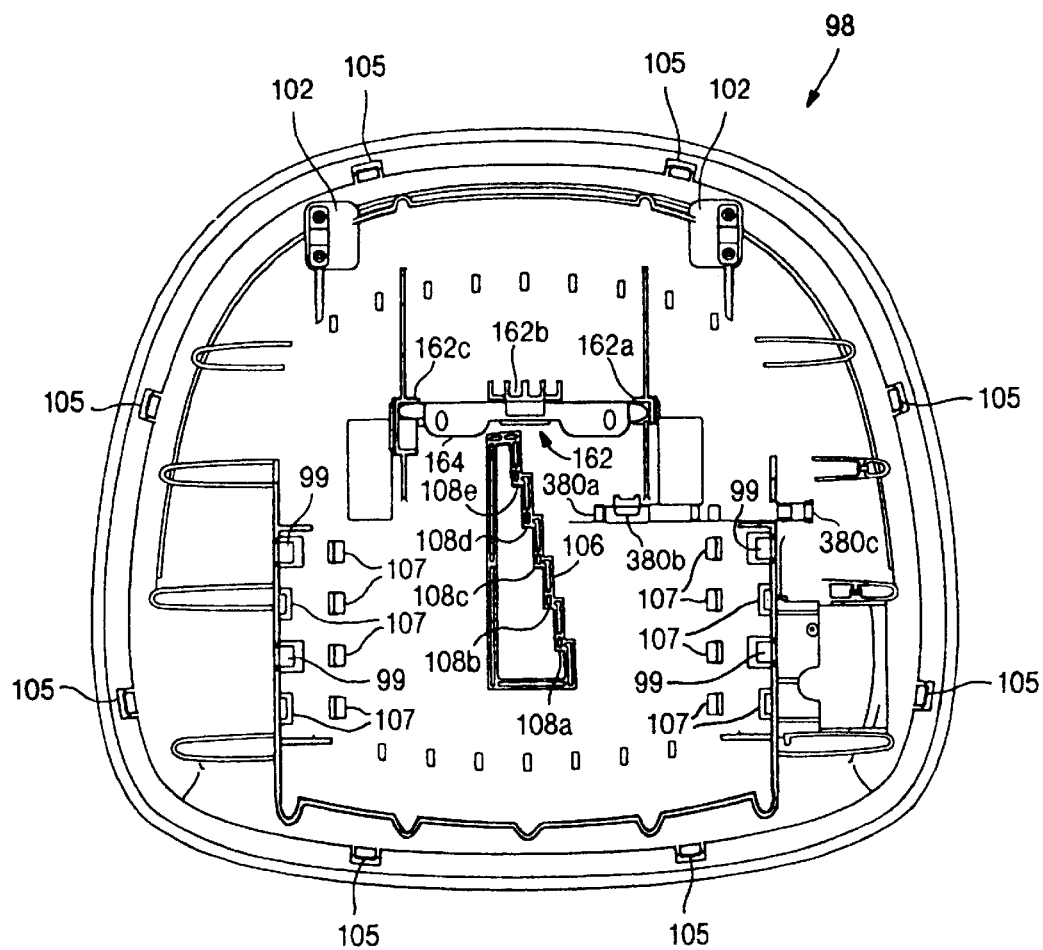
FIG. 25 is a bottom plan view of the seat frame.

As noted above, the rear of the seat 12 is operatively connected to the J-bar 50 and the front of the seat is operatively connected to the casting 42, whereby the seat 12 slides forwardly and rearwardly as the back 14 reclines and returns to the upright position, respectively. Referring now to FIG. 3, the seat 12 generally includes a seat frame 98 and a seat carrier 100 mounted to the seat frame 98. As shown in FIGS. 24 and 25, the seat frame 98 is generally concave, including a peripheral portion 96 defining a channel 97 for receiving the seat carrier 100. The seat frame 98 includes a pair of downwardly extending mounting posts 102 disposed toward opposite lateral sides of the frame 98. The mounting posts 102 are fitted within the seat mounting slots 78 and are pivotally secured to the rear pins 82 by mounting caps 95 (See FIGS. 3 and 52). The front of the frame 86 is movably mounted to the casting 42 by a track and roller assembly. More specifically, the seat 12 includes roller tracks 104 disposed on opposite lateral sides of the seat frame 98. The tracks 104 entrap and are operatively interfitted with the front roller bearings 70 of the casting 42. As a result, the seat frame 98 (and hence the seat 12) is capable of forward and rearward movement with respect to the casting 42. The tracks 104 are preferably pre-manufactured and secured to the seat frame 98 by interaction of ribs 107 and locking tabs 99, which are integrally formed with the seat frame 98. The tabs 99 are preferably snap-fitted into corresponding slots 109 in the tracks 104. Alternatively, the tracks 104 may be secured by screws, bolts or other conventional fasteners. The seat frame 98 also includes a trackway 106 that interacts with the recline limit control mechanism 28 to adjustably limit the rearward recline of the back 14. The trackway 106 includes a plurality of offset steps 108a–e extending downwardly from the undersurface of the seat frame 98. In operation, this mechanism permits the user to set the maximum rearward recline of the back 14 to one of a plurality of different settings. In the illustrated embodiment, the recline limit control mechanism 28 provides five degrees of adjustment, one defined by each of the offset steps 108a–e. Operation of the recline limit control mechanism 28 is described in more detail below. The trackway 106 is preferably molded directly into the seat frame 98, but may be separately manufactured and secure to the seat frame 98, if desired. The seat frame 98 also includes a crankshaft mount 162 for mounting the crankshaft 162 of the tension linkage. The crankshaft mount 162 includes three separate portions 162a, 162b and 162c that receive the opposite ends and center portion of the crankshaft 164. The crankshaft 164 is snap-fitted into center portion 162b. Opposite ends of the crankshaft 164 are rotatably received in end portions 162a and 162c. The seat frame 98 further includes a Z-bar mount 380 for mounting the Z-bar 352 of the tension linkage. The Z-bar mount 380 includes three separate portions 380a, 380b and 380c. Portions 380a and 380c rotatably receive end portions of the Z-bar 352. The Z-bar 352 is snap-fitted into center portion 380b. Operation of the crankshaft 164, Z-bar 352 and the tension control linkage is described in more detail below. The seat frame 98 is preferably injection molded from a material having sufficient structural characteristics to support the seat carrier 100 and the associated loads. For example, the seat frame 98 may be manufactured from thirty percent glass-filled polypropylene or from nylon.

Figure 26:
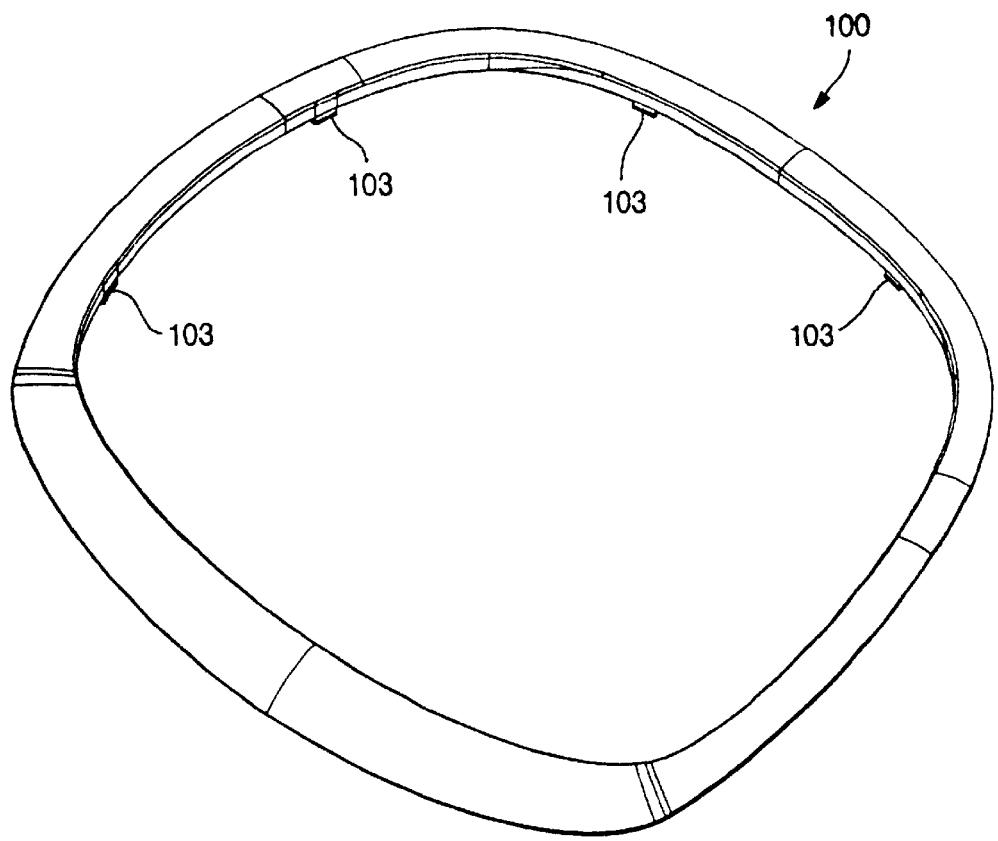
FIG. 26 is a perspective view of the seat carrier.
Figure 27:
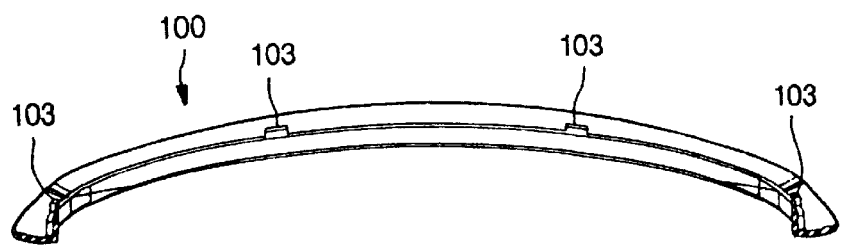
FIG. 27 is a sectional view of the seat carrier taken along line XXVII—XXVII of FIG. 26.

The seat carrier 100 is secured to the seat frame 98 within the channel 97. The seat carrier 100 is shown in FIGS. 26 and 27. Certain aspects of the seat carrier 100 are described in detail in U.S. patent application Ser. No. 09/769,967, which as noted above is incorporated herein by reference. Like the back carrier 88, the seat carrier 100 includes a load bearing fabric 101 (See FIG. 1) that is stretched across and secured to the seat carrier 100, preferably as an integral part of the seat carrier molding process. The seat carrier 100 is fitted into channel 97 and is preferably intersecured with the seat frame 98 by snaps 103 that are snap-fitted into corresponding slots 105 in the base of channel 97. The snaps 103 preferably include a hooked end to securely interlock the seat carrier 100 with the seat frame 98. The seat carrier 100 is preferably injection molded from glass filled polypropylene or other similar materials.

Figure 45:
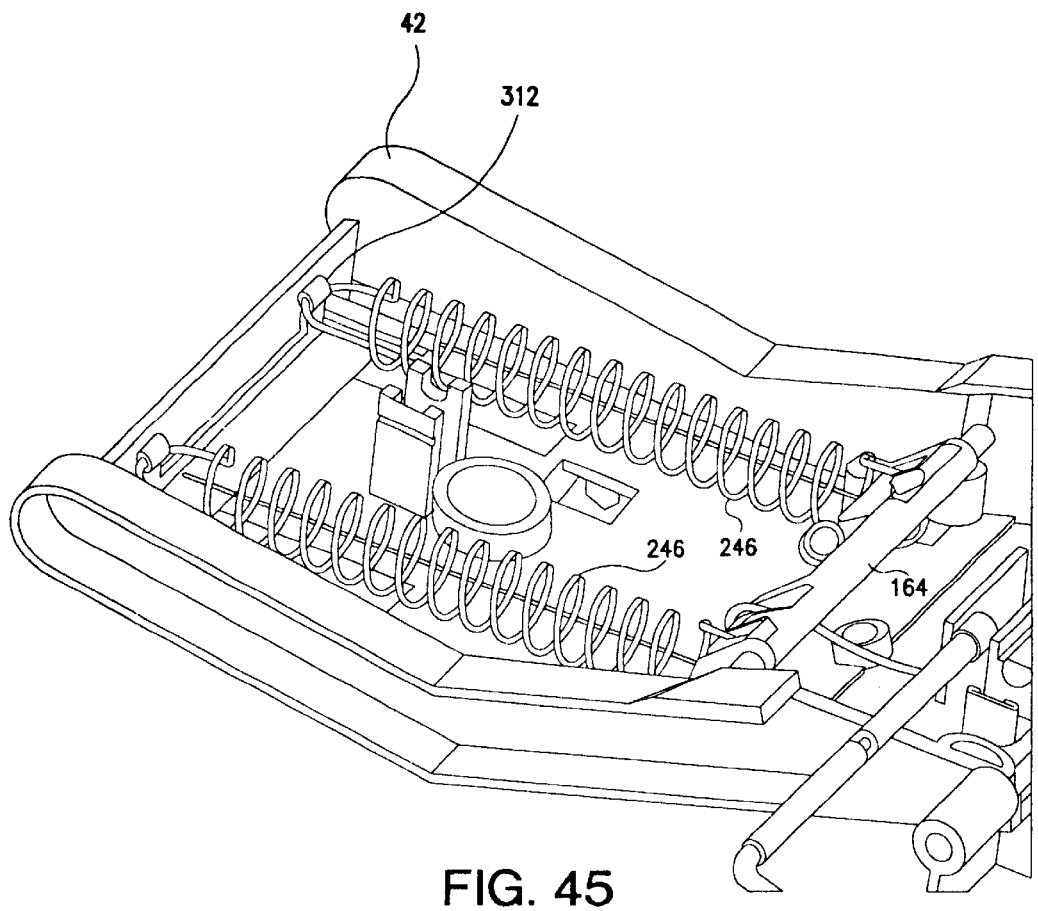
FIG. 45 is a perspective view of portions of the chair showing the interconnection of the tension springs between the crankshaft and the spring plate.

The seat 12 is biased in its rearmost position (with respect to the casting 42) by a pair of recline tension springs 246. FIG. 45 shows the casting 42, the crankshaft 164 and the tension springs 246. The seat frame 98 and other components are removed to provide a clear view of these components. It should be noted that while FIG. 45 shows the crankshaft 164 "floating" in space, it is actually snap-fitted to the seat frame 98 as described above and shown in FIG. 25. The recline tension springs 246 extend between the crankshaft 164 on the seat frame 86 and the spring plate mount 312 on the casting 42. As described in more detail below, the amount of pre-tension on the recline tension spring 246 can be selectively varied by pivoting the crankshaft 164 through operation of the tension control knob 250 and associated linkage.

Figure 28:
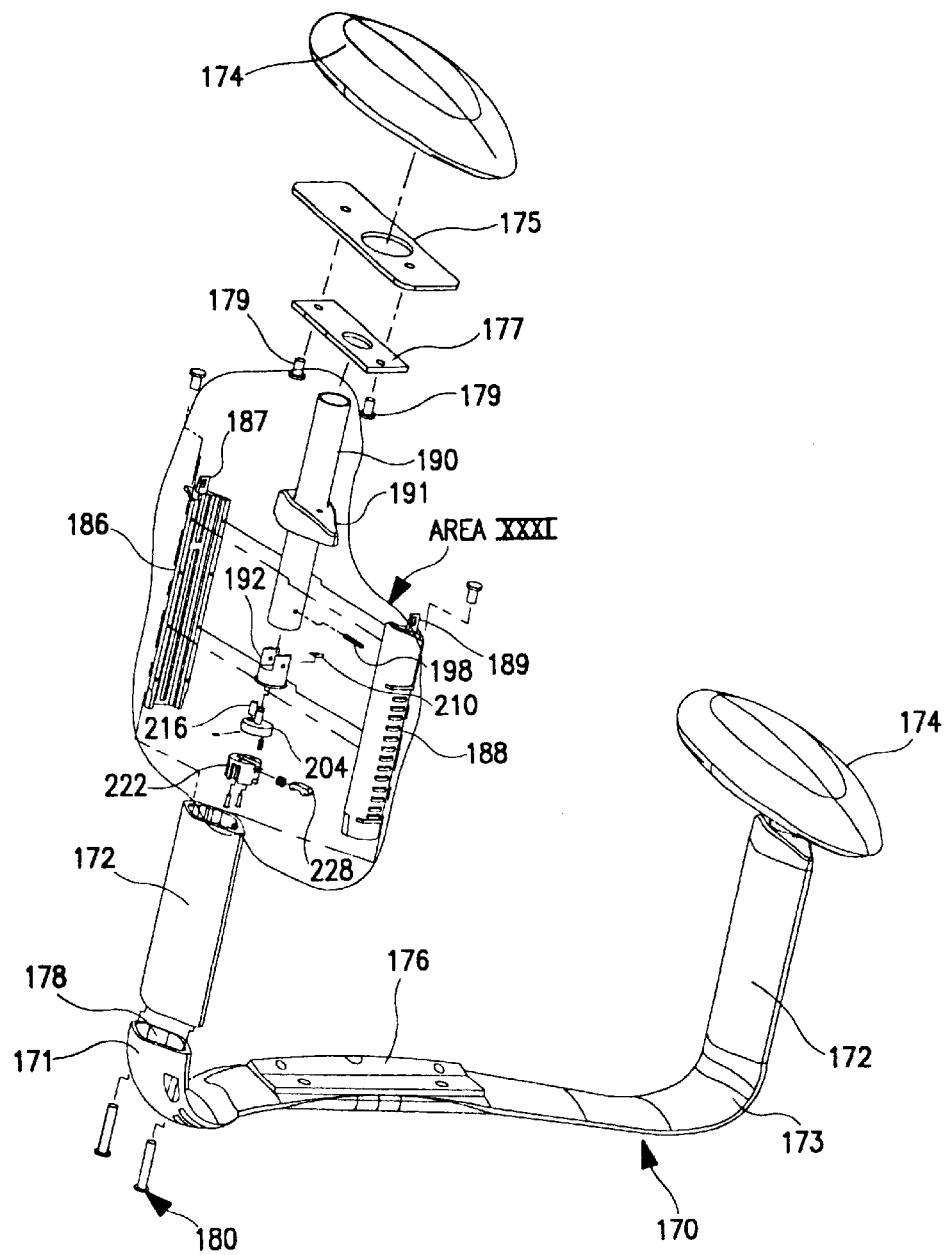
FIG. 28 is a partially exploded perspective view of the armrest assembly.
Figure 29:
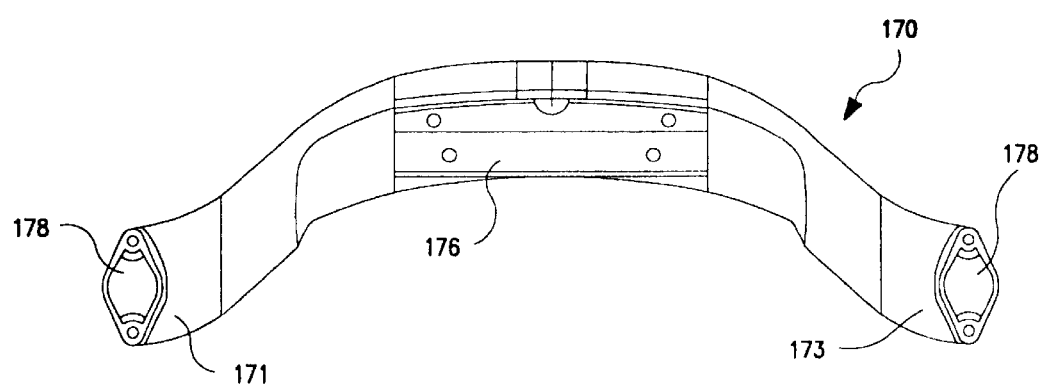
FIG. 29 is a top plan view of the stretcher.

The armrest assembly 16 is mounted to the casting 42 and generally includes left 22 and right 24 armrests secured to opposite ends of a cross stretcher 170 (See FIG. 28). The armrests 22 and 24 each include an upright 172 that is mounted to the cross stretcher 170 and an armpad 174 mounted to the upright 172. Each armpad 174 includes a mounting plate 175 that is secured to the undersurface of the armpad 174 using fasteners or other conventional attachments. With reference to FIG. 29, the cross stretcher 172 is horizontally extending member that is mounted directly to the casting 42 at mounting surface 176. Opposite ends 171 and 173 of the cross stretcher 172 are turned upwardly to define a pair of upright mounts 178. The upright mounts 178 are somewhat diamond shaped in cross-section. The uprights 172 are mounted to the upright mounts 178, for example, by screws 180, and are somewhat diamond shaped in cross-section to match the shape of the mounts 178. The uprights 172 are essentially hollow providing a void 182 for containing the armrest adjustment mechanism 184.

Figure 30:
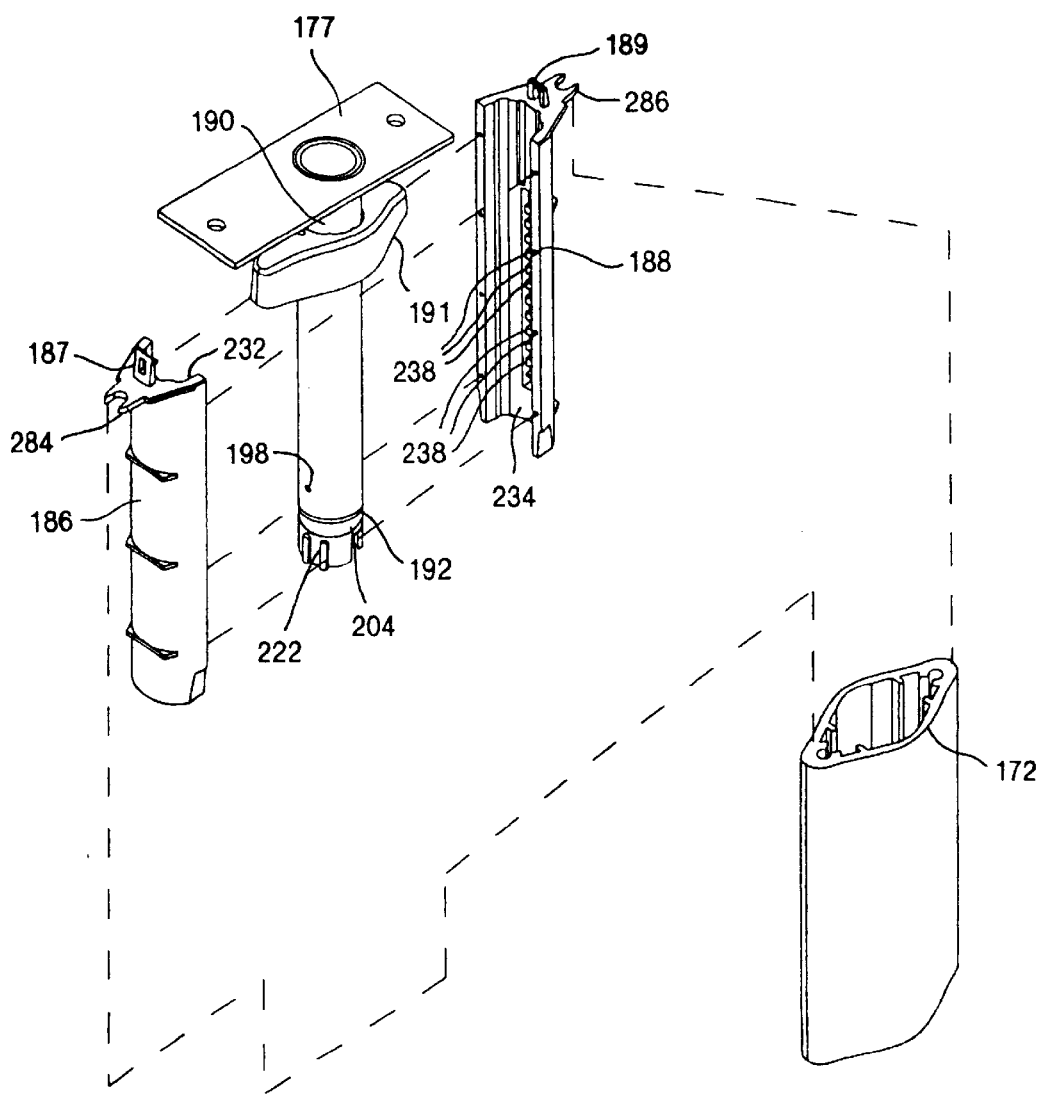
FIG. 30 is a partially exploded perspective view of a single armrest.
Figure 31:
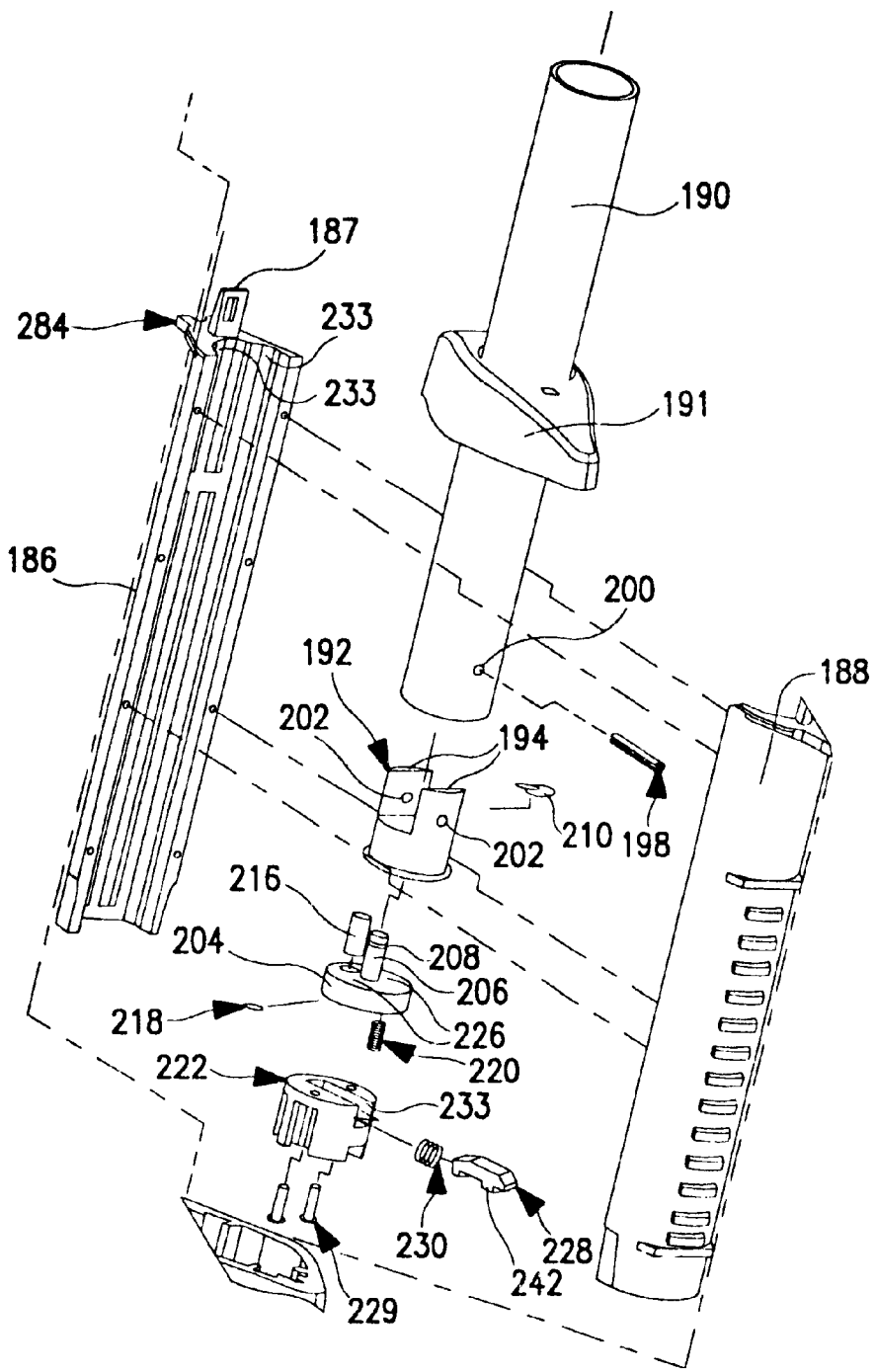
FIG. 31 is an enlarged view of area XXXI of FIG. 28.

The armrest adjustment mechanism 184 will be described with reference to FIGS. 30–40. Because the left 22 and right 24 armrests are substantially identical, only the left armrest 22 will be described in detail. Referring now to FIG. 30, the armrest adjustment mechanism 184 generally includes an arm tube 190 movable mounted between a guide bearing 186 and a height adjustment bearing 188. A top plate 177 is mounted to the upper end of the tube 190, for example, by welding. The top plate 177 is secured to the mounting plate 175 by screws 179 (See FIG. 28). A cover 191 is slidably fitted over the tube 190 to close the upper end of the upright 172 is the assembled armrest. The guide bearing 186 is fitted within the rear of the upright 172 and defines a semicircular recess 232 opening toward the front of the upright 172. The guide bearing further defines a pair of alignment slots 233 that prevent rotation of the lower plug 222. The guide bearing 186 includes an upwardly extending cover mounting tab 187 for mounting cover 191 and a screw slot 286 for mounting the guide bearing 186 to the upright 172. The height adjustment bearing 188 is fitted within the front of the upright 172 and defines a semicircular recess 234 opening toward the rear of the upright 172. The recesses 232 and 234 cooperatively define a circular opening through the upright 172 having an inner diameter that is slightly greater than the outer diameter of the tube 190. Accordingly, the tube 190 is permitted to travel vertically within the upright 172 between the bearings 186 and 188. The height adjustment bearing 188 defines a plurality of ratchet-shaped notches 238. The upper surface 237 of each notch 238 is preferably inclined to provide ratcheting interaction with the plunger 228. The upper surface of the uppermost notch defines a reset surface 238. The reset surface 238 extends farther toward the tube 190 than the upper surfaces 237 of the other notches 238. As a result, the reset surface 238 retracts the plunger 228 into the reset position when the armpad 174 is fully raised. The bottom surface of the lowermost notch 238 defines a release surface 241 that moves the plunger 228 out of the reset position when the armpad 174 is fully lowered. The operation of the reset mechanism will be described in more detail below. The height adjustment bearing 188 includes an upwardly extending cover mounting tab 189 for mounting cover 191 and a screw slot 288 for mounting the height adjustment bearing 186 to the upright 172.

Figure 35:
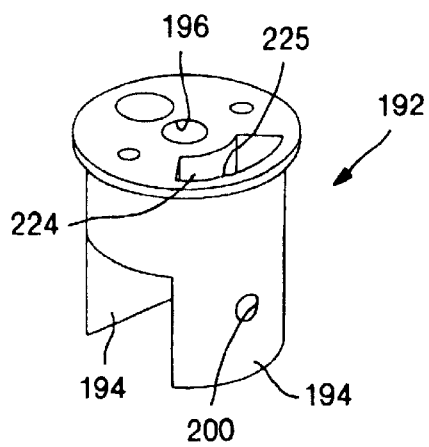
FIG. 35 is bottom perspective view of the upper plug.
Figure 36:
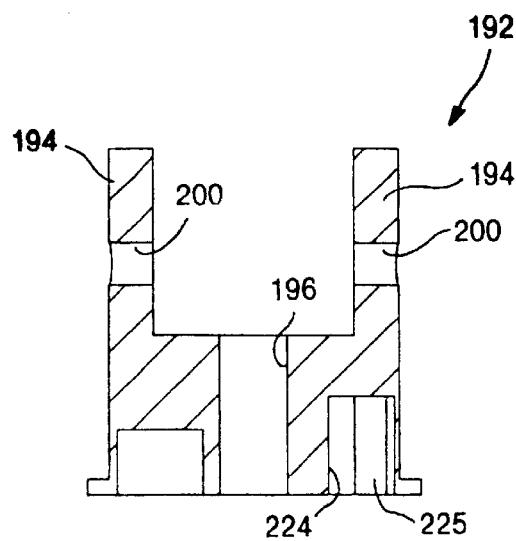
FIG. 36 is a sectional view of the upper plug taken along line XXXVI—XXXVI.
Figure 37:
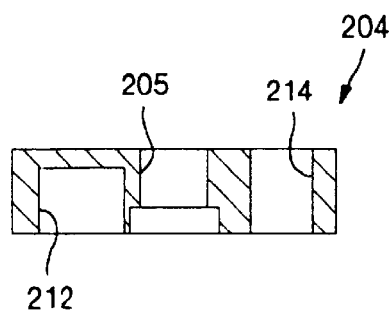
FIG. 37 is a sectional view of the pivot bearing.
Figure 38:
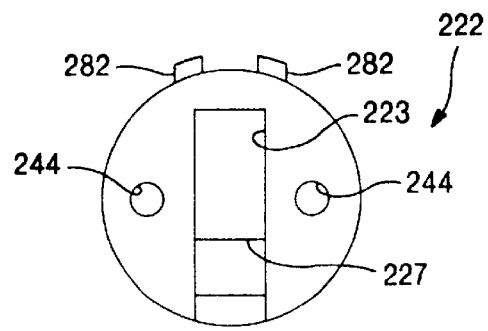
FIG. 38 is a top plan view of the lower plug.
Figure 39:
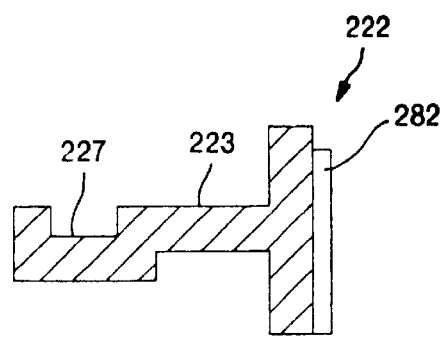
FIG. 39 is a sectional view of the lower plug taken along line XXXIX—XXXIX of FIG. 38.
Figure 40:
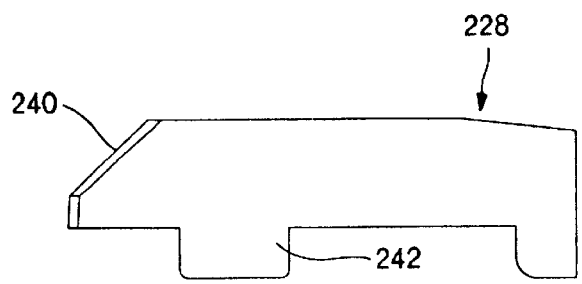
FIG. 40 is a side elevational view of the plunger.

An upper plug 192 is fitted within the bottom of arm tube 190. The upper plug 192 includes a pair of mounting arms 194 for securing the plug 192 to the tube 190 (See FIGS. 31 and 35). More specifically, the upper plug 192 is secured to the arm tube 190 by a pin 198 extending through holes 200 defined in the tube 190 and holes 202 defined in the mounting arms 194. The upper plug 192 defines a central bore 196 for rotatably securing a pivot bearing 204 to the undersurface of the upper plug 192 and an arcuate slot 224 for shepherding rotational movement of the pivot bearing 204 through interaction with pin 216, as described below. The slot 224 preferably extends through an approximately 90-degree arc, thereby providing the armrest with approximately 90 degrees of rotational movement. The length and position of the slot 224 can be varied to alter the range of motion of the armrest. As shown in FIG. 35, the slot 224 includes a pair of small rounded protrusions 225 that extend into the slot 224. The pivot bearing 204 is generally disc-shaped and includes a centrally located shaft 206 that is fitted within the central bore 196 of the upper plug 192 (See FIGS. 31 and 32). The shaft 206 is fitted within bore 205 and retained by retaining clip 218. The shaft 206 defines a groove 208 that receives a retaining clip 210 for intersecuring the upper plug 192 and pivot bearing 204. The pivot bearing 204 also defines a downwardly opening spring bore 212 and a pin bore 214. A limit pin 216 is fitted within the pin bore 214. The limit pin 216 extends upwardly into the slot 224 in the upper plug 192 to shepherd rotational movement of the armrest and provide a tactile response when the armrest is rotated past the protrusions 225 into one of three desired positions. The limit pin 216 is preferably press-fitted into place in bore 214. A reset spring 220 is fitted within spring bore 212. The function of the reset spring 220 will be described below. The pivot bearing 204 further defines a pair of screw holes 226. A lower plug 222 is secured to the undersurface of the pivot bearing 204, preferably by screws 229 extending through holes 244 in the lower plug 222 into screw holes 226 in the pivot bearing 204. The lower plug 222 is generally disc shaped having an outer diameter substantially identical to the outer diameter of the tube 190. The lower plug 222 defines a plunger slot 223 extending along a portion of a diameter of the plug 222 and a locking recess 227 extending downwardly from the plunger slot 224. The lower plug 222 includes a pair of vertically extending ribs 282 that are slidably fitted into slots 233 in the guide bearing 186 to prevent rotation of the lower plug 222. A plunger 228 and a spring 230 are fitted within the plunger slot 223. The plunger 228 includes an inclined front surface 240 that is rounded to correspond with the curvature of the height adjustment bearing 188 and a downwardly extending catch 242 (See FIG. 40) that is adapted to selectively fit into locking recess 227. The spring 230 biases the plunger 228 toward the notches 238 in the height adjustment bearing 188.

Figure 32:
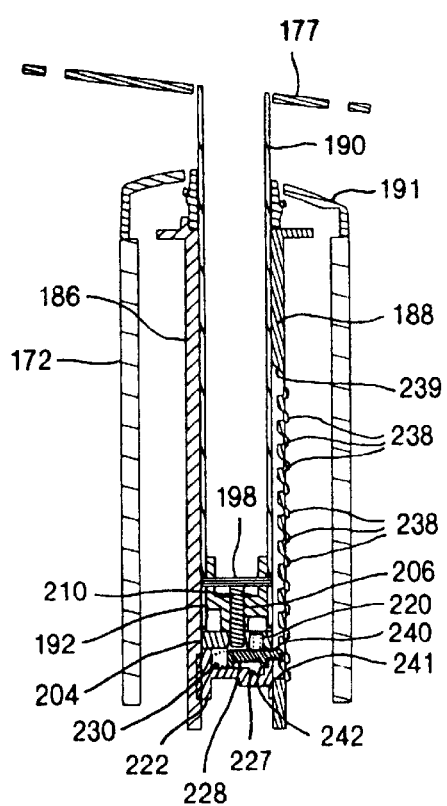
FIG. 32 is a sectional view of an armrest showing the interconnection of portions of the armrest adjustment mechanism.
Figure 33:
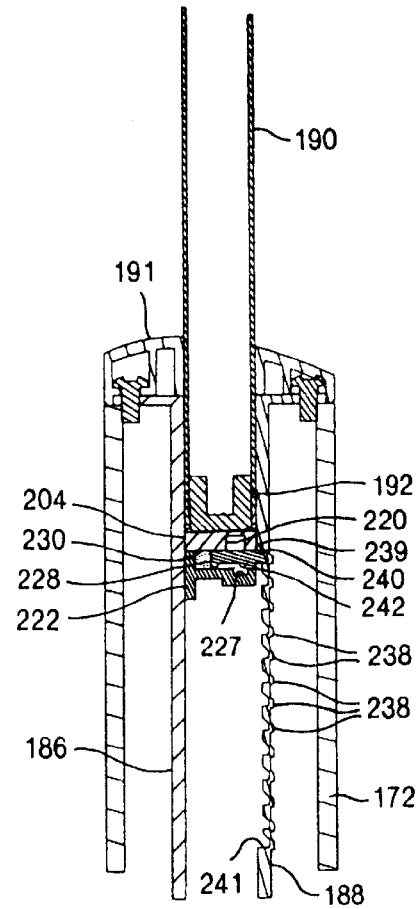
FIG. 33 is a sectional view of an armrest showing portions of the armrest adjustment mechanism with the tube in the uppermost position.
Figure 34:
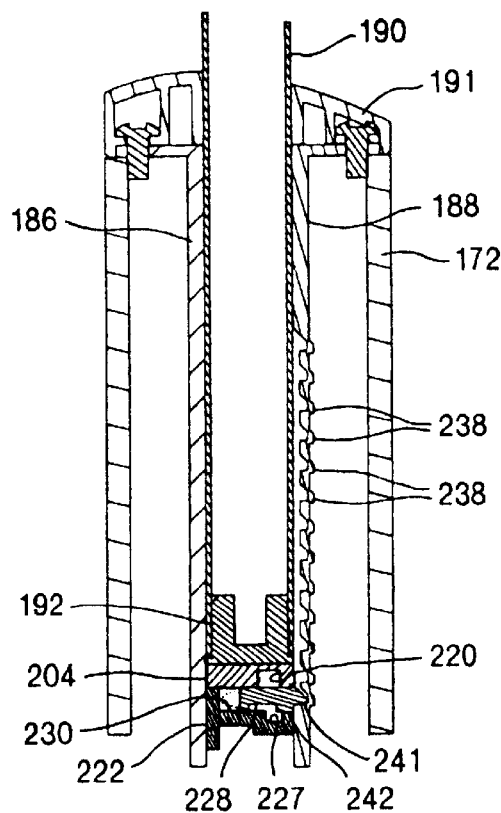
FIG. 34 is a sectional view of an armrest showing portions of the armrest adjustment mechanism with the tube in the lowermost position.

Operation of the armrest adjustment mechanism 184 will now be described in connection with FIGS. 32–34. FIGS. 32 and 34 show the armrest 22 in the bottom position. The armrest 22 is raised simply by lifting upwardly on the armpad 174. Interaction of the inclined surface 240 of the plunger 228 and the inclined surfaces 237 of the notches 238 causes the plunger 228 to retract into the lower plug 222 in a ratchet-like manner as the armrest 22 is raised. The interaction retracts the plunger 228 a sufficient distance to permit the plunger 228 to clear the notches 238, but not a sufficient distance for the catch 242 to align with the locking recess 226. The spring 230 returns the plunger 228 to the extended position as each new notch 238 is reached. Because the lower surfaces of the plunger 228 and notches 238 are substantially parallel, downward movement of the armrest is precluded unless the plunger 228 is locked in the reset position. When the armrest 22 has reached its top position (See FIG. 33), further upward movement locks the plunger 228 into the reset position. More specifically, the inclined surface 239 at the top of the uppermost notch 238 causes the plunger 228 to retract farther than the other notches 238. The plunger 228 retracts until the catch 242 is in alignment with the locking recess 227. Once aligned, further interaction between the plunger 228 and the surface 239 moves the plunger 228 downwardly causing the catch 242 to enter the locking recess 227. The reset spring 220 provides a constant downward force on the plunger 228 pushing and holding the catch 242 in the locking recess 227. This locks the plunger 228 in the retracted position where it is disengaged from the notches 238, thereby permitting the armrest 22 to be lowered. Once the armrest 22 is fully lowered (See FIG. 34), the plunger 228 engages the reset surface 241 at the base of the lowermost notch 238. This forces the plunger 228 upward with respect to the lower plug 222. Once the plunger 228 is lifted a sufficient distance for the catch 242 to disengage from the locking recess 226, the plunger spring 230 returns the plunger 228 to the extended position. The armrest 22 can then be lifted to the desired height as described above.

The armrest adjustment mechanism 184 also permits manual rotational movement of the armrest. When the armrest is rotated, the tube 190 and attached upper plug 192 rotate about shaft 206 of the pivot bearing 204, while the pivot bearing 204 and lower plug 22 remain stationary with respect to the upright 172. The limit pin 216 and slot 224 cooperate to limit the range of movement of the armrest. As noted above, the slot 224 extends through an arc of approximately 90 degrees. Because this arc is centered, the armrest is permitted to rotate left or right a distance of approximately 45 degrees from center. The limit pin 216 and slot 224 also cooperate to provide a tactile response when the armrest is centered or at its leftmost or rightmost extremes. More specifically, the protrusions 225 interfere with movement of the limit pin 216 through the slot 224 to resist, but not prevent, rotational movement of the armrest between the center, leftmost and rightmost positions.

III. Seat Controls

As noted above, the control mechanism 26 permits adjustment of a variety of components of the chair 10. The control mechanism 26 generally includes a tension control mechanism 118 that controls the amount of resistance to reclining movement of the back 14, a recline limit control mechanism 28 that controls the rearward limit on reclining movement of the back 14 and a height control mechanism 160 that controls the height of the support column 36 (and consequently the seat 12). The control mechanism 26 includes a control housing 156 that is mounted to the seat frame 98. The control housing 156 includes an integral throat 157. The control housing 156 is preferably configured to snap fit into place on the seat frame 98, but it can be secured using fasteners or other conventional mechanisms.

Figure 44:
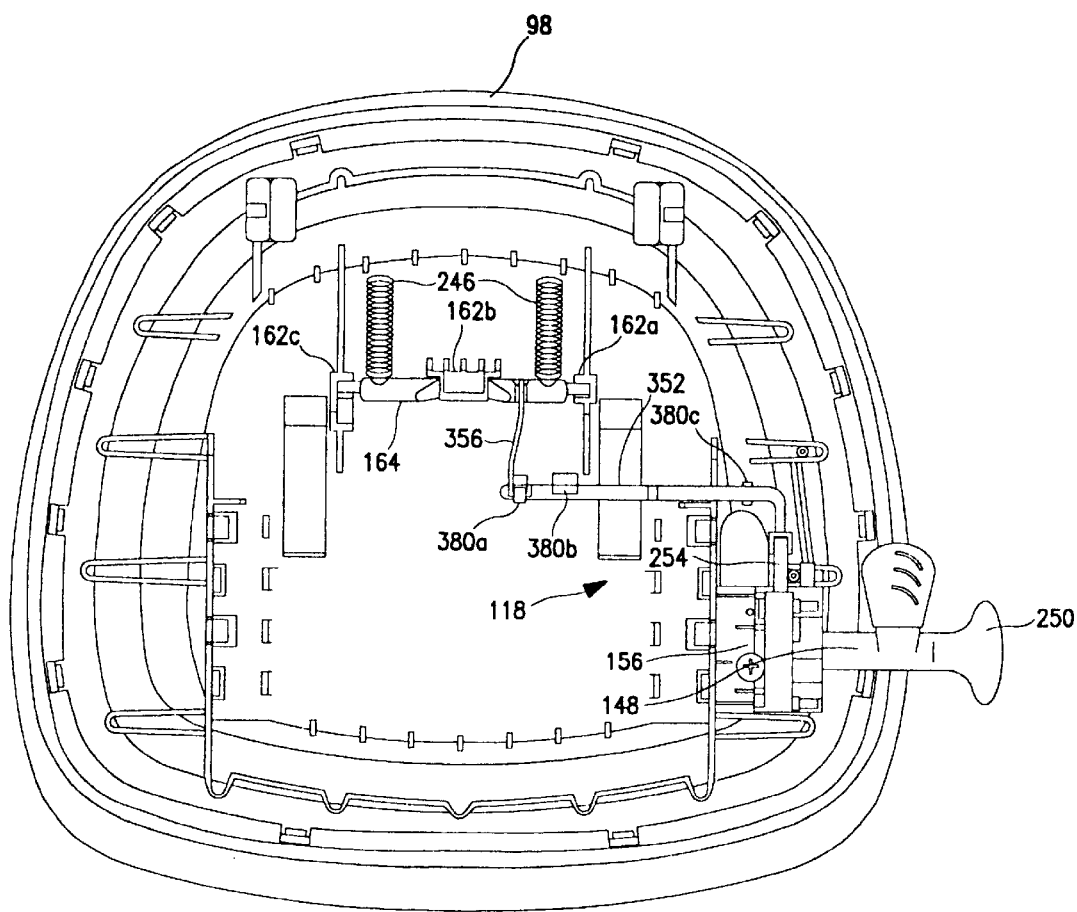
FIG. 44 is a bottom plan view of the chair with portions removed to show the tension control linkage.
Figure 46:
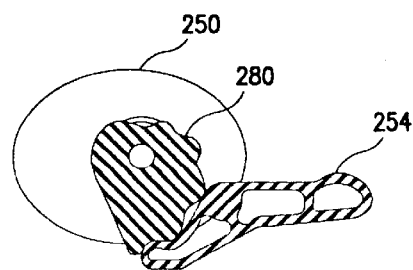
FIG. 46 is a sectional view of the control mechanism showing the cam and lever interaction of the tension control mechanism.

The tension control mechanism 118 includes a tension knob 250 that is rotated to control the tension at which the back 14 reclines. As noted above, the tension in the back recline is created by a pair of recline tension springs 246 that extend between the seat frame 98 and the casting 42. As perhaps best shown in FIG. 45, the tension springs 246 extend between spring mounting plate 312 (secured to casting 42) and crankshaft 164 (secured to seat frame 98). The recline tension springs 246 are arranged to resist forward movement of the seat frame 98 with respect to the casting 42 and to bias the seat frame 98 in the rearmost position. The tension knob 250 is operatively linked to the recline tension spring 246 by a linkage. The linkage includes a cam 280 that is rotatably mounted within housing 156. The cam 280 includes an integral shaft 350 that extends through the throat 157 of the housing 156 and is secured to the tension knob 250 so that rotation of the knob 250 the causes rotation of cam 280. The linkage further includes a lever 254 pivotally mounted in the housing 156 adjacent to the cam 280 so that rotational movement of the cam 280 results in pivotal movement of the lever 254 (See FIG. 46). As perhaps best shown in FIGS. 43 and 44, a Z-bar 352 is pivotally mounted to the undersurface of the seat frame 98 with its first end in operative connection with the lever 254. As a result, movement of the lever 254 results in pivotal movement of the Z-bar 352. The second end of the Z-bar 352 is operatively connected to a wire 356. The wire 356 extends between and operatively interconnects the Z-bar 352 and the crankshaft 164 so that pivotal movement of the Z-bar 352 results in pivotal movement of the crankshaft 164. Pivotal movement of the crankshaft 164 varies the length of the tension springs 246, thereby varying the amount of pre-tension in the springs 246 and consequently the amount of tension in the back recline. The unique construction of the tension control mechanism 118 is fully adjustable through only approximately 180 degrees of rotation of the tension knob 250.

Figure 48:
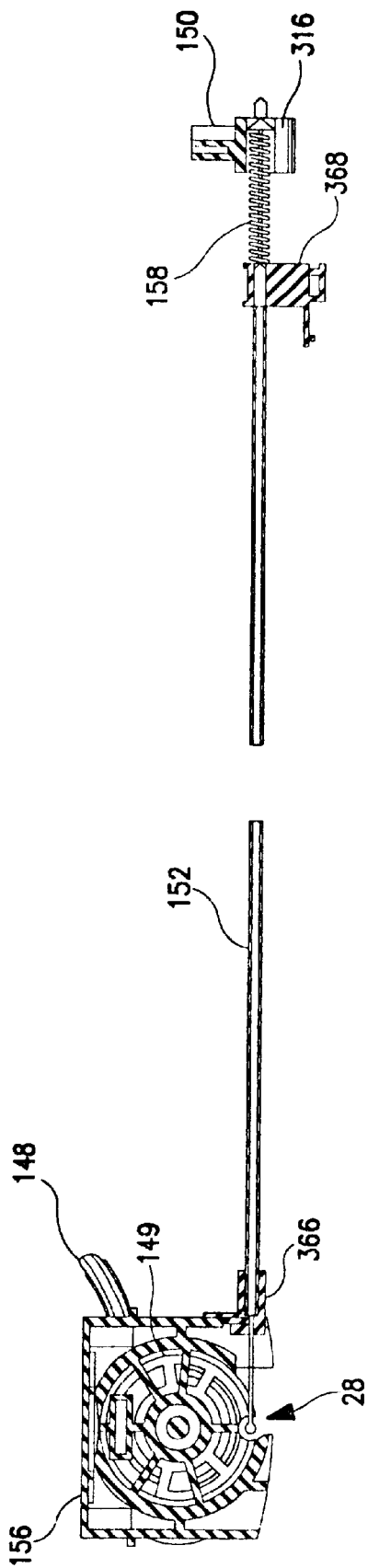
FIG. 48 is a sectional view of the control mechanism showing the internal components of the recline limit control mechanism.
Figure 49:
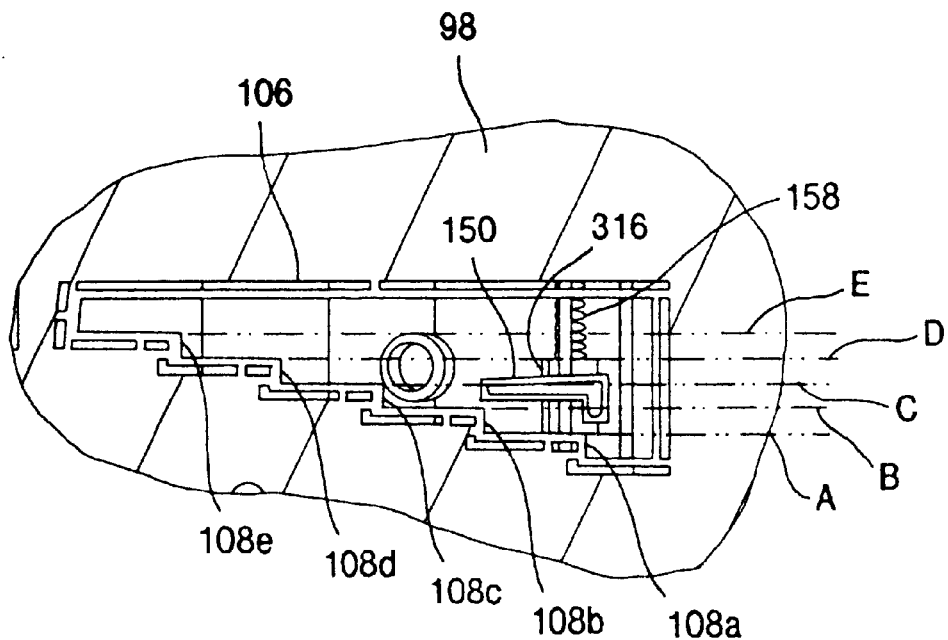
FIG. 49 is a top plan view of a portion of the seat frame with portions removed to show the interaction of the trackway and the stop.
Figure 50:
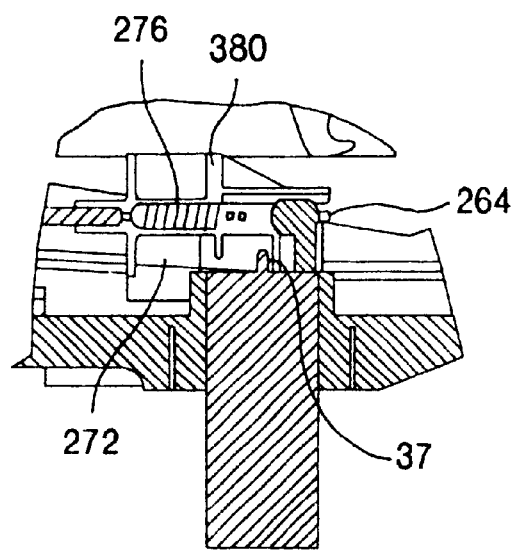
FIG. 50 is sectional view of a portion of the chair showing the height control wing assembled adjacent the toggle switch.
Figure 51:
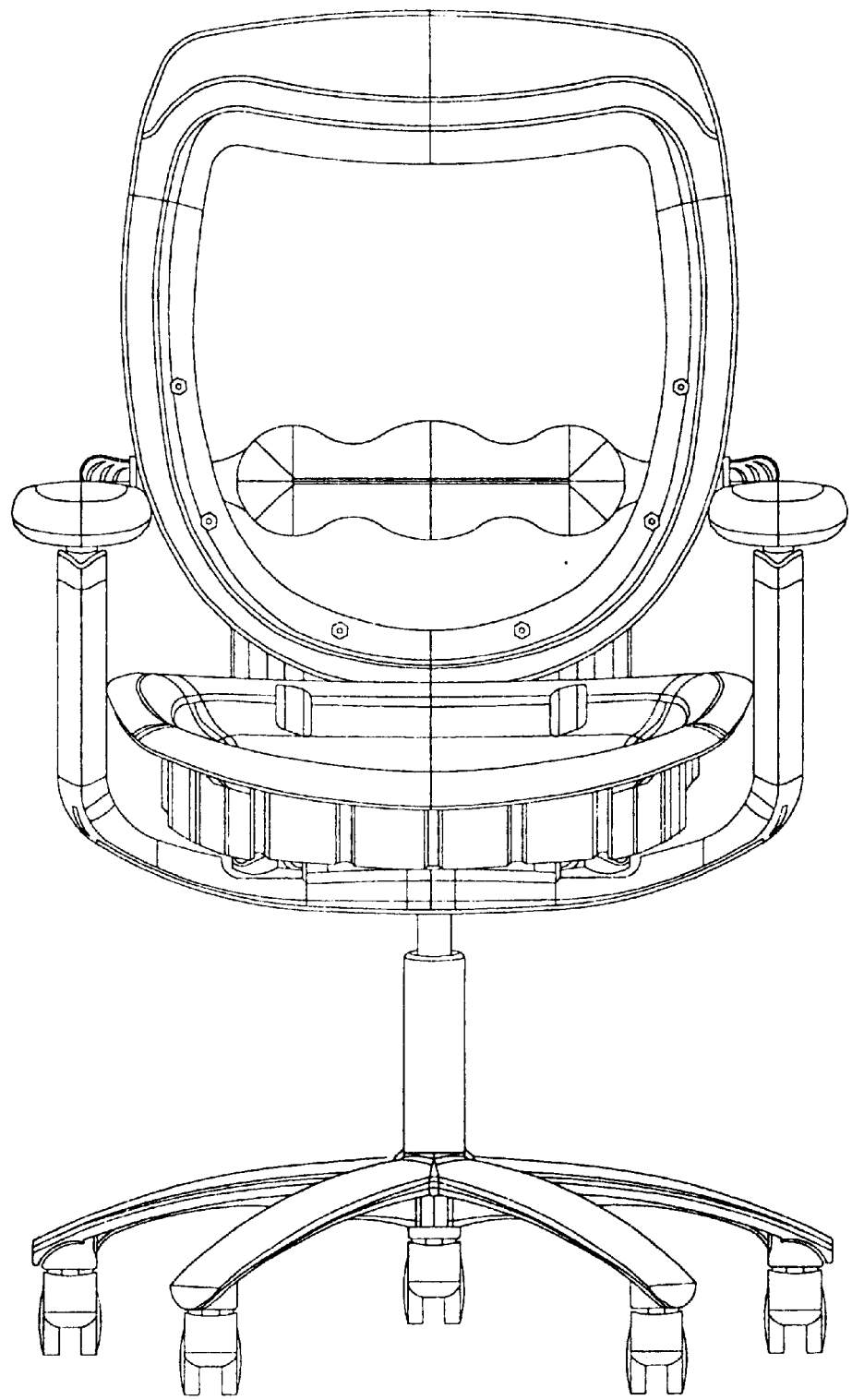
FIG. 51 is front elevational view of the chair with the load bearing fabric and control mechanisms removed.
Figure 52:
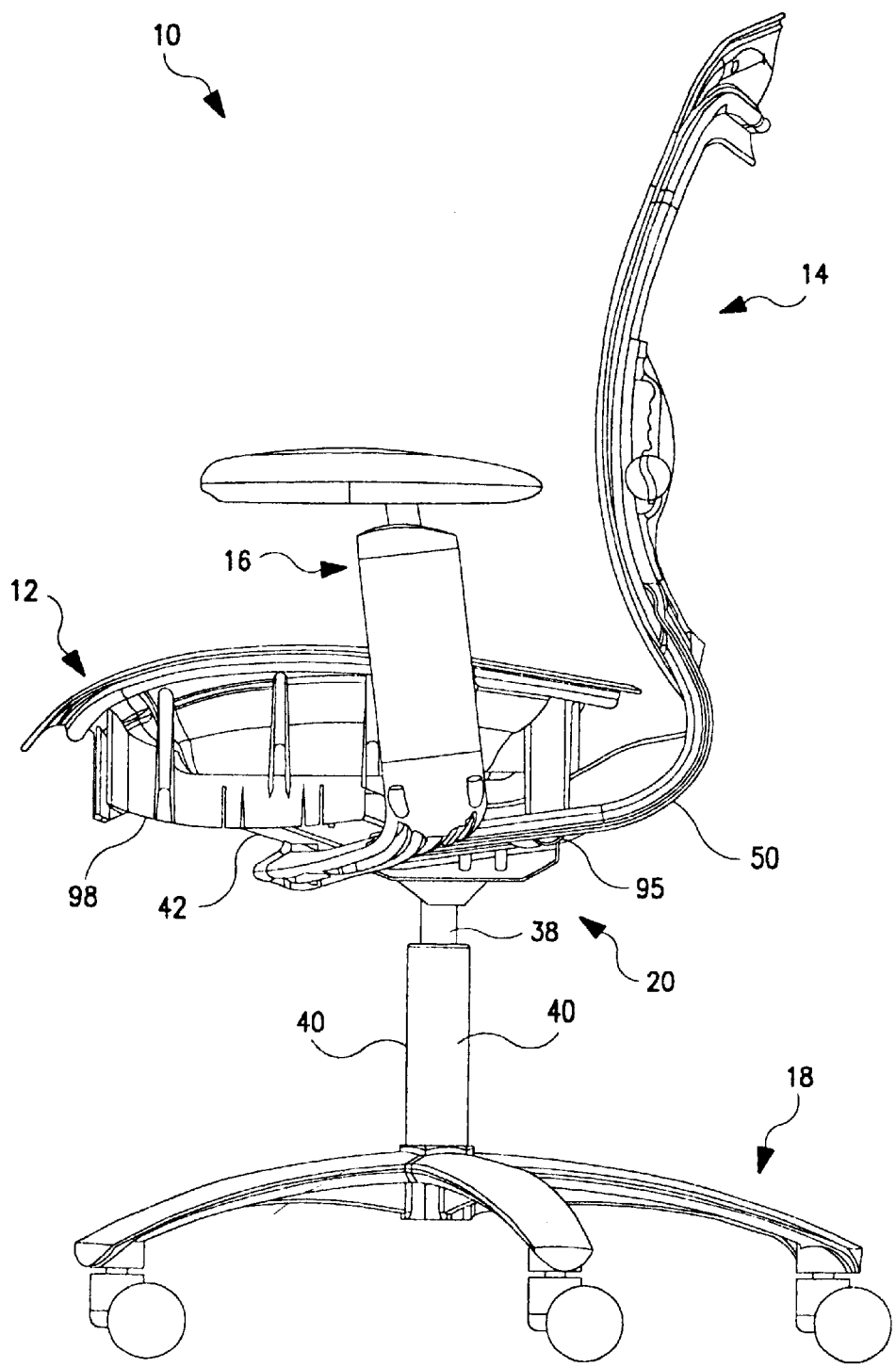
FIG. 52 is right side elevational view of the chair with the load bearing fabric and control mechanisms removed.
Figure 53:
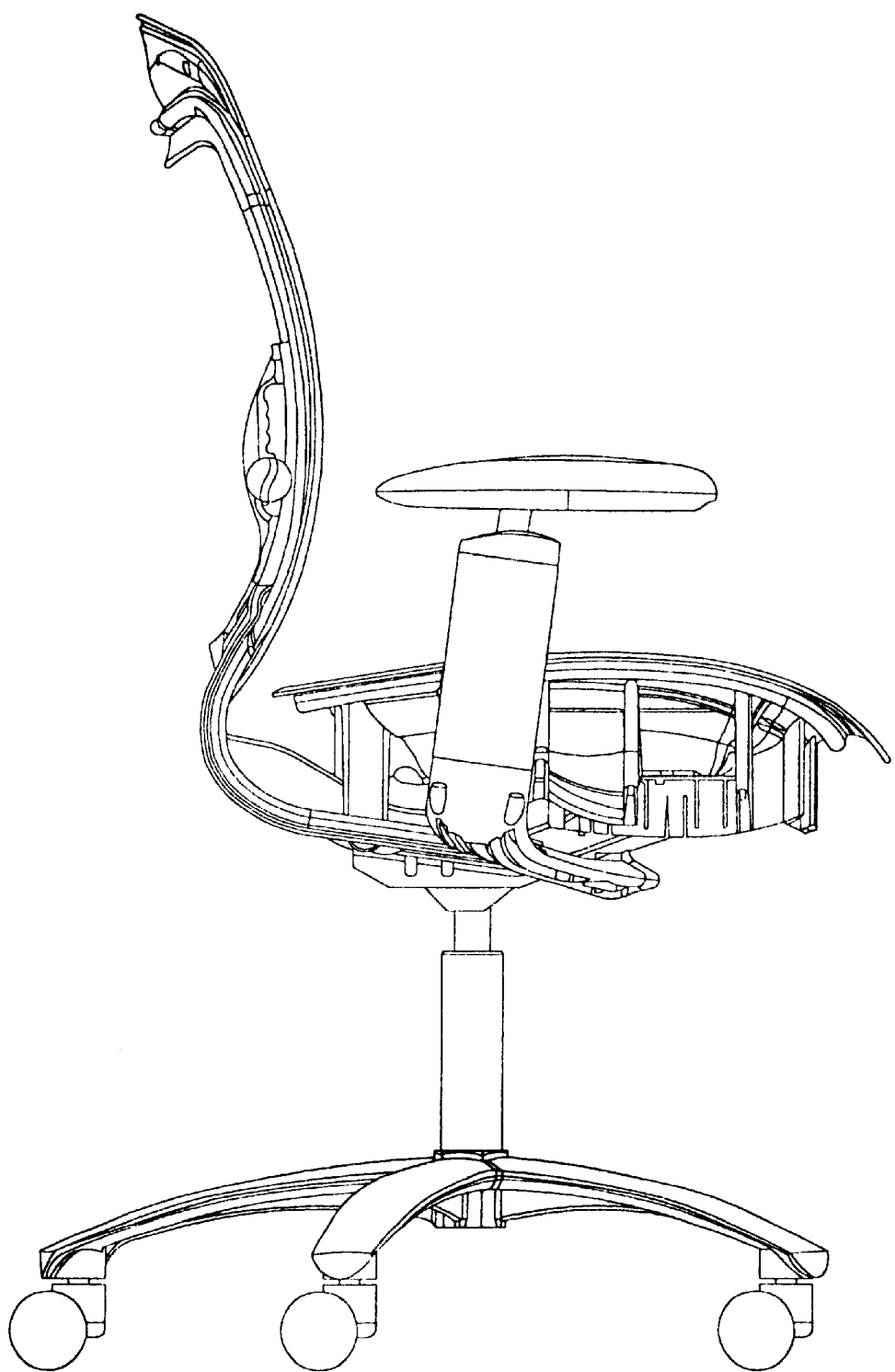
FIG. 53 is left side elevational view of the chair with the load bearing fabric and control mechanisms removed.
Figure 54:
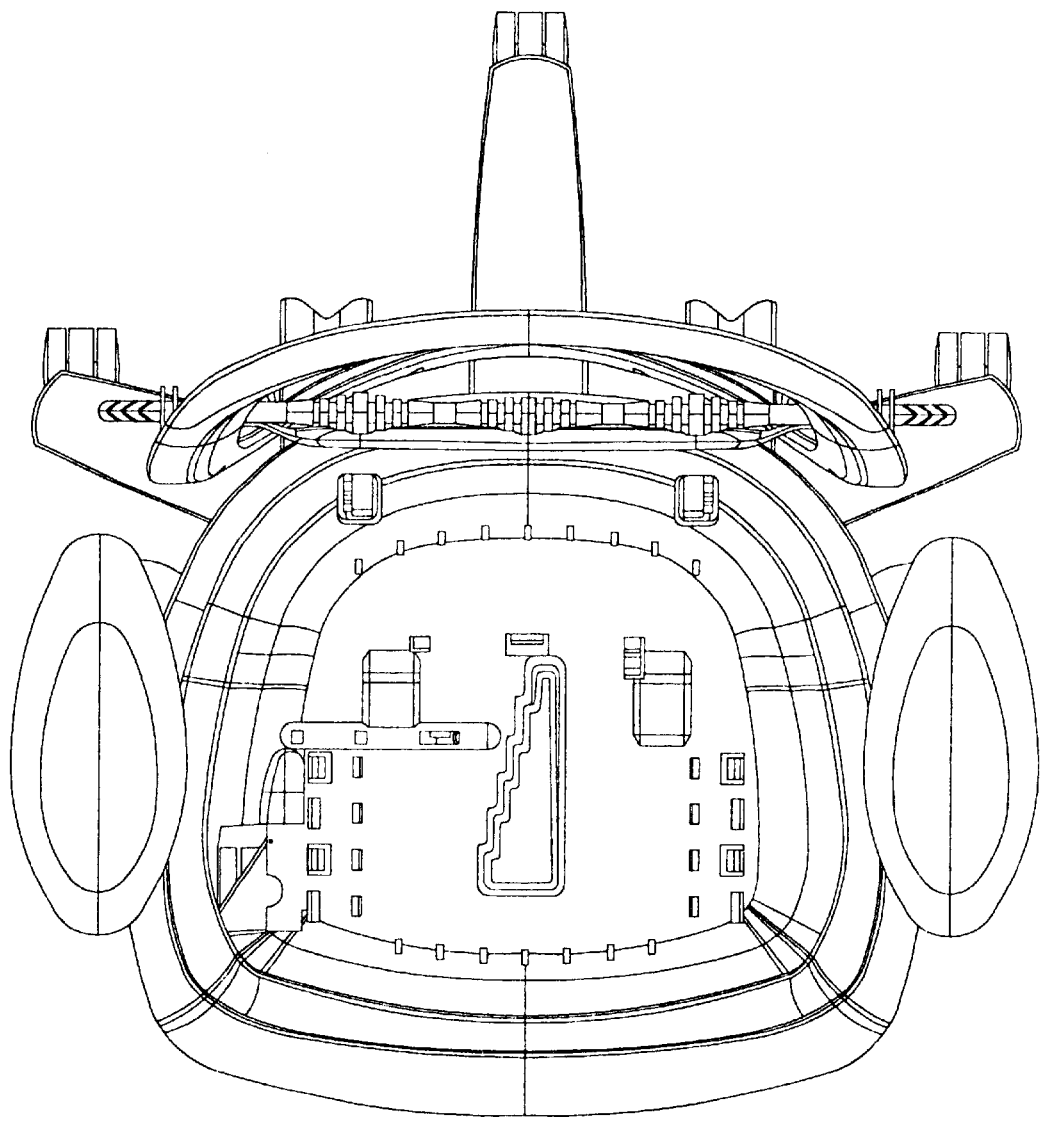
FIG. 54 is top plan view of the chair with the load bearing fabric and control mechanisms removed.
Figure 55:
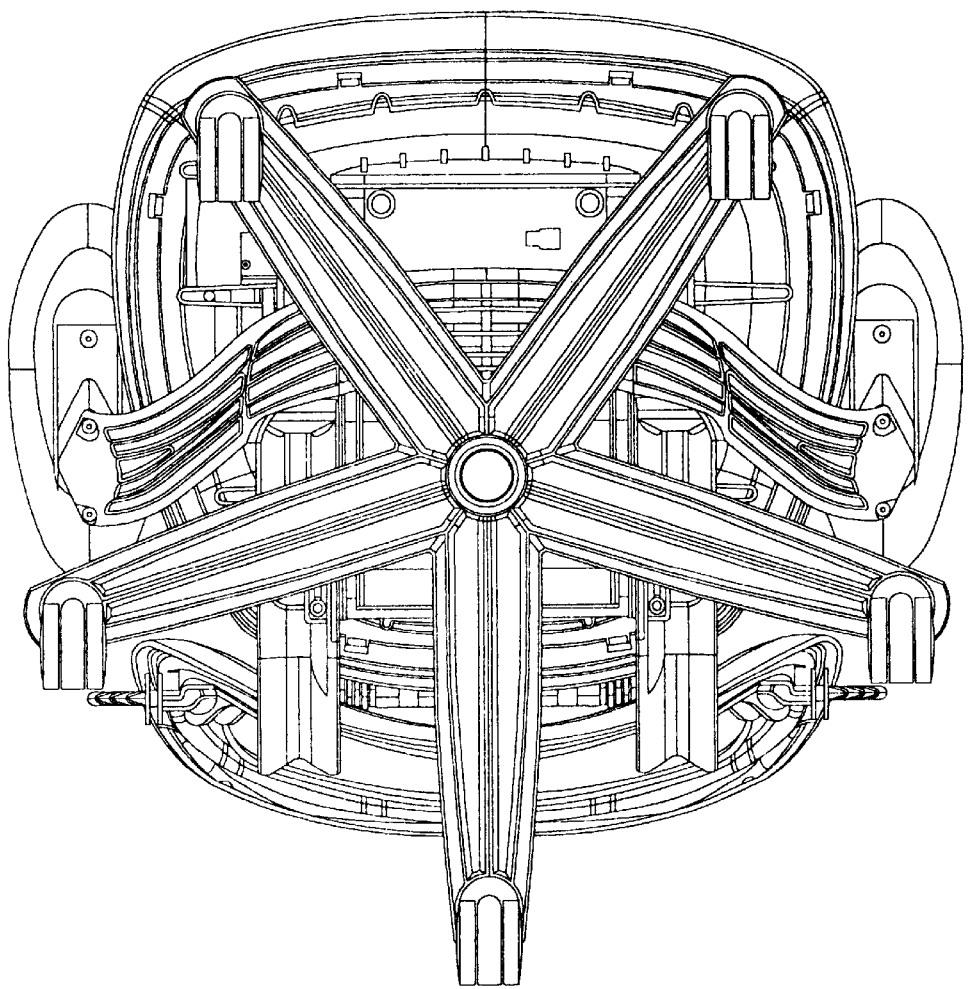
FIG. 55 is bottom plan view of the chair with the load bearing fabric and control mechanisms removed.

The recline limit control mechanism 28 functions to control the limit of rearward recline in the back 14. The recline limit control mechanism 28 includes a recline limit control lever 148 positioned where it is easily accessible to the occupant, preferably about the throat 157 of the housing 156. The lever 148 preferably includes an integral rotor 149. A control cable 152 is mounted to the rotor 149 and a stop 150 mounted to the control cable 152. As shown in FIG. 48, the first end of the cable sheath 154 is mounted to the control housing 156 at neck 366 and the second end of the cable sheath 154 is mounted to the casting 42 by a retainer 368. Although not shown, the retainer 368 is snap-fitted into place on the casting 42 whereby the stop 150 is positioned in the path along which the trackway 106 will travel when the seat frame 98 moves. If desired, a detent spring 370 may be fitted into the housing 156 is engagement with the rotor 149 to provide tactile feedback, such as a snap, when the lever 148 is properly positioned in one of its five positions. A spring 158 is preferably fitted over the second end of the cable 152 to bias the stop 150. The stop 150 is slidably fitted within stop track 310 and includes a retaining rib 316 that is fitted within notch 314 in wall 322 or 324. In operation, pivotal movement of the lever 148 results in linear movement of the stop 150 with respect to the trackway 106. More specifically, movement of the lever 148 causes the rotor 149 to rotate within housing 156, thereby extending or retracting the cable 152. This in turn causes the stop 150 to move linearly along the track 310 to align with different steps 108a–e in the trackway 106. Lines A, B, C, D and E of FIG. 49 show the five different positions of the stop 150. As the back 14 is reclined, the seat frame 98 moves with respect to the casting 42 until the trackway 106 engages the stop 150. Once the trackway 106 and stop 150 engage, further movement of the seat frame 98, and consequently rearward recline, is prevented. In the preferred embodiment, the trackway 106 and the stop 150 are configured so that the first position provides no seat travel (See FIG. 49, line A), the second position provides one inch of seat travel (See FIG. 49, line B), the third position provides two inches of seat travel (See FIG. 49, line C), the fourth position provides three inches of seat travel (See FIG. 49, line D) and the fifth position provides four inches of seat travel (See FIG. 49, line E). The configuration of the trackway 106, for example, the number and location of step 108a–e may vary from application to application to provide the desired range of adjustability.

Figure 47:
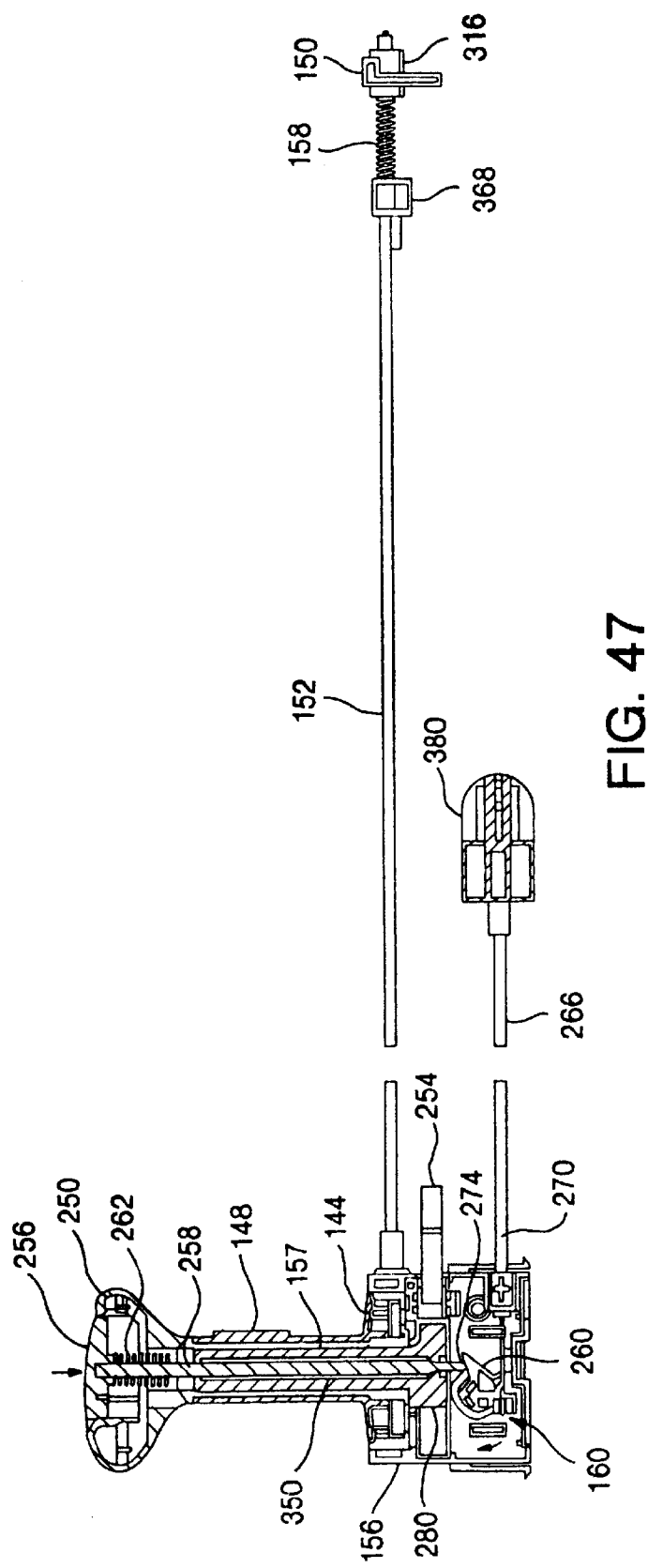
FIG. 47 is a sectional view of the control mechanism showing the internal components of various control mechanisms.

The height control mechanism 160 includes a push-button 256 mounted within the tension knob 250. The push button 256 includes an integral shaft 258 that extends into the control housing 156 through the center of the tension knob 250 and the cam 280. The shaft 258 is engaged with a rotor 260, and more particularly with surface 274 of rotor 260. A spring 262 is disposed about shaft 258 to bias the push button 256 in an outward position. The rotor 260 is rotatably mounted within the control housing 156 to rotate in response to actuation of the push-button 256. A control cable 266 is secured about the rotor 260 so that rotation of the rotor 260 results in extension and retraction of the cable 266. The cable 266 is connected to a wing 264 so that extension and retraction of the cable 266 results in movement of the wing 264. The wing 264 is movable mounted within a fitting 380 that is secured to the cable sheath 270. A spring 276 is disposed about the second end of the cable 266 between the sheath 270 and the wing 264 to bias the wing 264 in the extended position. The fitting 380 is mounted to the height control clevis 272 on casting 42 with the wing 264 located in operative engagement with the toggle switch 37 of the support column height actuator (not shown). As a result, movement of the wing 264 operates the toggle switch 37 and consequently the height actuator. In operation, depression of the push-button 256 causes shaft 258 to engage and apply force to surface 274, thereby causing clockwise (when view from the perspective shown in FIG. 47) rotational movement of the rotor 260 about its axis. Clockwise rotational movement of the rotor 260 wraps the cable 266 around the rotor 260 causing it to retract. This results in inward linear movement of the wing 264 and actuation of the toggle switch 37. Actuation of the toggle switch 37, releases the locking mechanism of the support column height actuator (not shown), thereby permitting adjustment of the height of the support column 36. The height actuator (not shown) of the support column 36 functions in a generally conventional manner, raising the upper tube 38 (and consequently the seat 12 and back 14) through an internal spring (not shown) and lowering the upper tube 38 (and consequently the seat 12 and back 14) through downward force applied by the occupant. When the seat 12 is in the desired position, the user releases push button 256. The button spring 262 and wing spring 276 extend the cable 266 and return the push button 256 to the outward position. This returns toggle switch 37 to the locked position, thereby engaging the locking mechanism of the support column height actuator (not shown) and securing the seat 12 and back 14 at the selected height.

The above description is that of a preferred embodiment of the invention. Various alterations and changes can be made without departing from the spirit and broader aspects of the invention as defined in the appended claims, which are to be interpreted in accordance with the principles of patent law including the doctrine of equivalents. Any reference to claim elements in the singular, for example, using the articles "a," "an," "the" or "said," is not to be construed as limiting the element to the singular.

The embodiments of the invention in which an exclusive property or privilege is claimed are defined as follows:

1. A chair comprising:

a recliner mechanism;

a back movably mounted to said recliner mechanism, said recliner mechanism permitting said back to recline under a force to a selectable limit;

a seat movably mounted to said recliner mechanism and operatively linked to said back, whereby said seat moves forwardly as said back reclines;

a recline limit control mechanism for adjustably controlling said selectable limit, said control mechanism including a trackway and a stop, at least one of said trackway and said stop traveling forwardly along a path as said seat moves forwardly, said selectable limit being defined by engagement of said stop with said trackway, said stop being movable with respect to said trackway such that said selectable limit is adjusted by movement of said stop, said recline limit control mechanism permitting said back to tilt forward of said selectable limit when said stop and said trackway are engaged.

2. A chair comprising:

a recliner mechanism;

a back movably mounted to said recliner mechanism, said recliner mechanism permitting said back to recline under a force to a selectable limit;

a seat movably mounted to said recliner mechanism and operatively linked to said back, whereby said seat moves forwardly as said back reclines;

a recline limit control mechanism for adjustably controlling said selectable limit, said control mechanism including a trackway and a stop, at least one of said trackway and said stop traveling forwardly along a path as said seat moves forwardly, said selectable limit being defined by engagement of said stop with said trackway, said stop being movable with respect to said trackway such that said selectable limit is adjusted by movement of said stop, wherein said trackway includes a plurality of laterally offset steps.

3. The chair of claim 2 wherein said offset steps are offset from one another in a lateral direction and in a longitudinal direction.

4. The chair of claim 3 wherein said offset steps are offset from one another in a lateral direction and in a longitudinal direction.

5. The chair of claim 4 wherein said trackway is carried by said seat and said stop is mounted to said recliner mechanism.

6. The chair of claim 5 wherein said stop is slidably mounted within a track on said recliner mechanism.

7. The chair of claim 6 wherein said control mechanism includes a lever, a rotor mounted to said lever and a cable mounted to said rotor, said stop being mounted to said cable, whereby movement of said lever results in movement of said stop.

8. The chair of claim 7 further comprising a bias means for biasing said seat in a rearward position at a tension, said bias means including a biasing element extending between said recliner mechanism and said seat, said biasing element having a pre-tension; and a tension control mechanism for adjustably controlling said tension by selectively varying said pre-tension in said biasing element.

9. The chair of claim 8 wherein said tension control mechanism includes a tension knob that is rotatably mounted to said chair, said tension knob being operatively linked to said biasing element such that rotation of said tension knob results in variation in said pre-tension in said biasing element.

10. The chair of claim 9 wherein said tension knob includes a shaft, said lever being rotatably mounted about said shaft with said lever disposed adjacent to said tension knob.

11. The chair of claim 10 further comprising an adjustable height support column; and a height control mechanism for selectively adjusting a height of said support column, said height control mechanism including a push button mounted within said tension knob.

12. A chair comprising:

a recliner mechanism:

a back mounted to said recliner mechanism, said back being reclinable between a default position and a reclined position under a rearward force;

a seat movably mounted to said recliner mechanism and operatively linked to said back, whereby said seat moves forwardly along a path from a rearward position to a forward position as said back moves from said default position to said reclined position;

a bias means for biasing said seat in said rearward position at a tension, said bias means including a biasing element extending between said recliner mechanism and said seat, said biasing element having a pre-tension, said biasing element oriented substantially parallel to said path and adapted to be varied in pre-tension along said path;

a tension control mechanism adapted to selectively vary said pre-tension in said biasing element along said path, wherein said tension control mechanism includes a control knob rotatably mounted to said chair, said control knob being operatively connected to said biasing element, wherein rotation of said control knob varies said pre-tension in said biasing element, wherein said tension control mechanism includes a cam mounted to said control knob whereby rotation of said control knob results in rotation of said cam, said cam being operatively connected to said biasing element, wherein rotation of said cam varies said pre-tension in said biasing element, wherein said control mechanism includes a pre-tension lever operatively linked to said cam, said pre-tension lever pivoting in response to rotation of said cam, said pre-tension lever being operatively connected to said biasing element, wherein pivoting of said pre-tension lever varies said pre-tension in said biasing element, wherein said control mechanism provides full adjustment of said tension by rotation of said control knob through no more than about 180 degrees.

13. A chair comprising:

a recliner mechanism;

a back mounted to said recliner mechanism, said back being reclinable between a default position and a reclined position under a rearward force;

a seat movably mounted to said recliner mechanism and operatively linked to said back, whereby said seat moves forwardly from a rearward position to a forward position in a path as said back moves from said default position to said reclined position;

a bias means for biasing said seat in said rearward position at a tension, said bias means including a biasing element extending between said recliner mechanism and said seat, said biasing element having a pre-tension;

a tension control mechanism for adjustably controlling said tension by selectively varying said pre-tension in said biasing element, wherein said recline mechanism permits said back to recline to a limit; and a recline limit control mechanism for adjustably controlling said limit, said control mechanism including a trackway and a stop, at least one of said trackway and said stop traveling forwardly along a path as said seat moves forwardly, said limit defined by engagement of said stop with said trackway, said stop being movable with respect to said trackway such that said limit is adjusted by movement of said stop.

14. The chair of claim 13 wherein said control knob is mounted upon a shaft protruding from a control housing, said recline limit control mechanism including a lever mounted over said shaft.

15. The chair of claim 14 further comprising an adjustable height support column; and a height control mechanism for selectively adjusting a height of said support column, said height control mechanism including a push button mounted within said tension knob.

* * * * *